US006225795B1

(12) United States Patent
Stratakos et al.

(10) Patent No.: US 6,225,795 B1
(45) Date of Patent: May 1, 2001

(54) DISCRETE-TIME SAMPLING OF DATA FOR USE IN SWITCHING REGULATIONS

(75) Inventors: Anthony J. Stratakos, Fremont; David B. Lidsky, Oakland; William A. Clark, Fremont, all of CA (US)

(73) Assignee: Volterra Semiconductor Corporation, Fremont, CA (US)

( * ) Notice: Subject to any disclaimer, the term of this patent is extended or adjusted under 35 U.S.C. 154(b) by 0 days.

(21) Appl. No.: 09/481,744

(22) Filed: Jan. 11, 2000

Related U.S. Application Data

(63) Continuation of application No. 08/991,394, filed on Dec. 16, 1997, now Pat. No. 6,020,729.

(51) Int. Cl.[7] .................................................. G05F 1/56
(52) U.S. Cl. .......................................... 323/283; 323/284
(58) Field of Search .................................. 323/222, 224, 323/268, 266, 282, 284, 285, 283; 307/491

(56) References Cited

U.S. PATENT DOCUMENTS

| 4,357,572 | * | 11/1982 | Andersen et al. | 323/286 |
|---|---|---|---|---|
| 4,580,089 |   | 4/1986 | Grunsch et al. | 323/287 |
| 5,422,562 |   | 6/1995 | Mammano et al. | 323/282 |
| 5,514,947 | * | 5/1996 | Berg | 323/282 |
| 5,523,676 |   | 6/1996 | Bach et al. | 324/103 |
| 5,552,694 | * | 9/1996 | Appeltans | 323/222 |
| 5,578,916 | * | 11/1996 | Muterspaugh | 323/267 |
| 5,646,513 |   | 7/1997 | Riggio, Jr. | 323/285 |
| 5,675,240 | * | 10/1997 | Fujisawa et al. | 323/282 |
| 5,677,619 | * | 10/1997 | Doluca | 323/282 |
| 5,751,140 | * | 5/1998 | Canter | 323/282 |
| 6,020,729 |   | 2/2000 | Stratakos et al. | 323/283 |

FOREIGN PATENT DOCUMENTS

| 0 547 916 A2 | 6/1993 | (EP) . |
| WO 95/31033 | 11/1995 | (WO) . |

OTHER PUBLICATIONS

Severns et al., Modern DC–to–DC Switchmode Power Converter Circuits, Van Nostrand Reinhold Co., NY 11–1977 (no date).

Lloyd Dixon, "Average Current Mode Control of Switching Power Supplies", Unitrode Switching Regulated Power Supply Design Seminar Manual, Unitrode Corporation. C1–1 to C1–14, 1991.

(List continued on next page.)

Primary Examiner—Adolf Deneke Berhane
(74) Attorney, Agent, or Firm—Fish & Richardson P.C.

(57) ABSTRACT

A voltage regulator with a switch to alternately couple and decouple an input terminal to an output terminal with a variable duty cycle and a filter disposed between the input terminal and the output terminal to provide a substantially DC voltage at the output terminal. A sampling circuit makes measurements of an electrical characteristic of the voltage regulator at discrete moments of time, such as just before the opening and closing of the switch. A feedback circuit is coupled to the sampling circuit and the switch, and is configured to use the measurements to control the duty cycle to maintain the DC voltage substantially constant. The feedback circuit uses the switch as the resistive element in order to measure the current passing through the voltage regulator.

19 Claims, 7 Drawing Sheets

OTHER PUBLICATIONS

Llyod Dixon, "Switching Power Supply Topology Review", Unitrode Switching Regulated Power supply Design Seminar Manual. Unitrode Corp. P1–1 to PP. 1–11, 1991.

Kassakian et al., "DC/DC Converters", Principles of Power ELectronics, Addison–Wesley Publishing Co., Sec. 2.3, 20–23, 1991.

Kassakian et al., "High–Frequency Switching dc/dc Converters", Principles of Power Electonics, Addison–Wesley Publishing Co., Chapter 6, 103–137, 1991.

Kassakian et al., "Discrete–Time or Sampled–Data Models," Principles of Power Electronics, Addison–Wesley Publishing Co., Sec. 12.5, 313–315, 1991.

Kassakian et al., "Feedback Control Design", Principles of Power Electronics, Addison–Wesley Publishing Co., Chapter 14. 365–402, 1991.

Kassakian et al., "Dynamics and Control: An Overview", Principles of Power Electronics, Addison–Wesley Publishing Co., Chapter 11, 253–298, 1991.

* cited by examiner

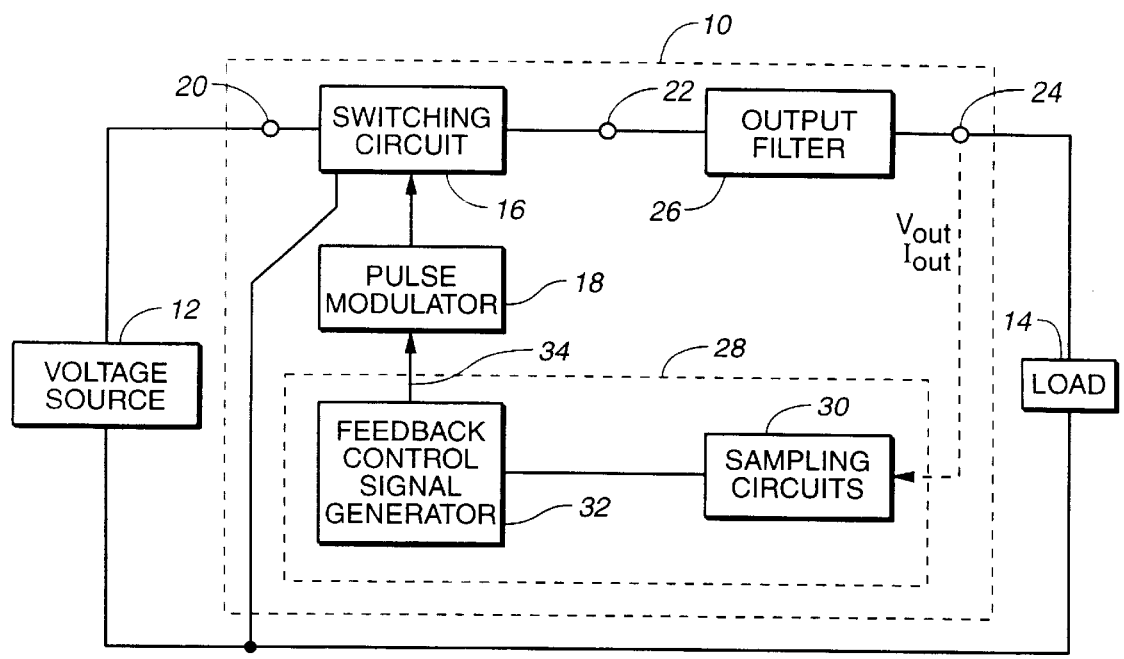
FIG._1
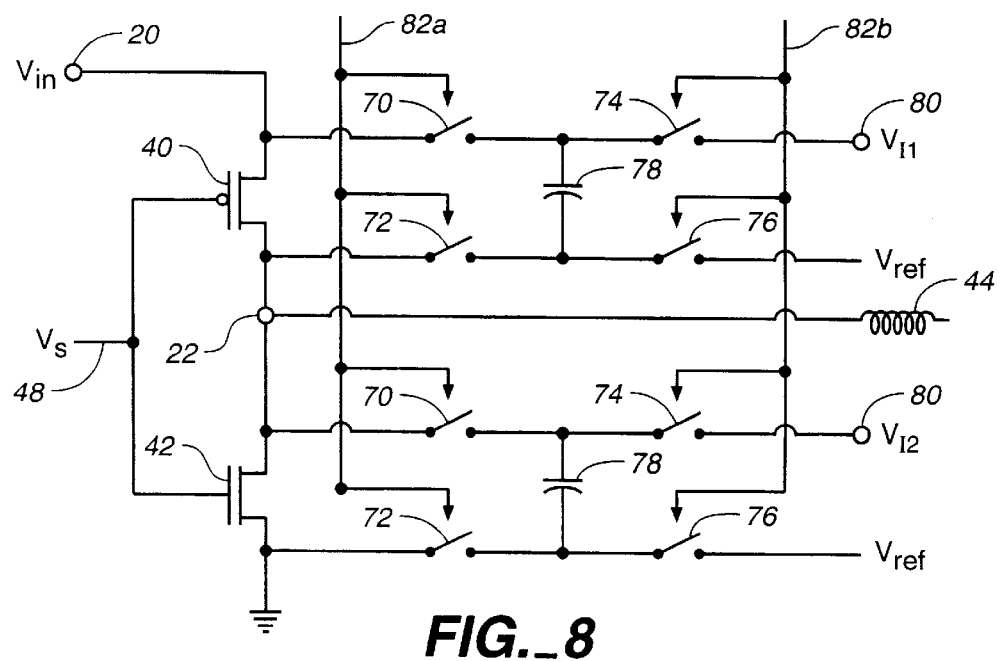
FIG._8

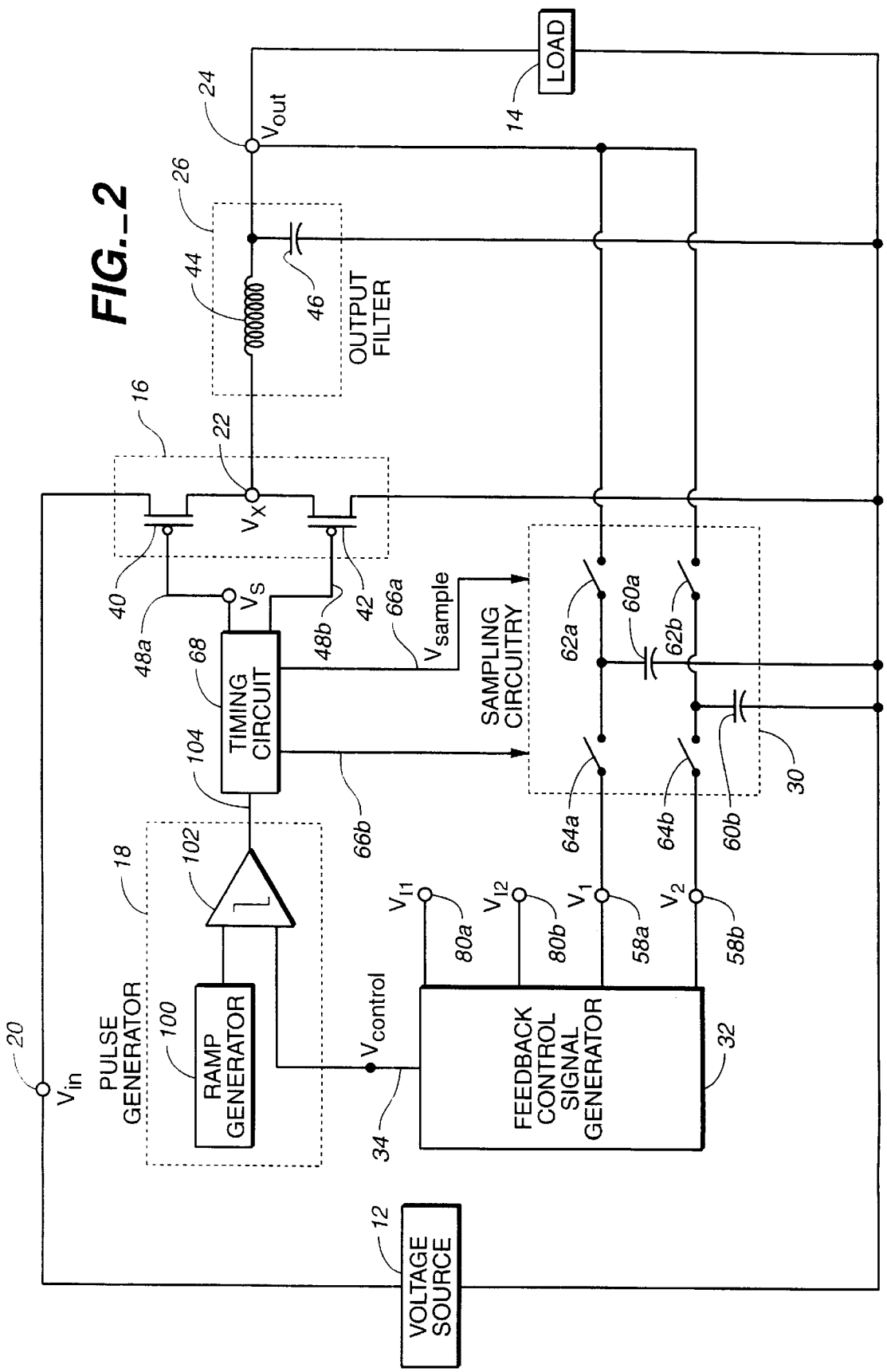
FIG._2

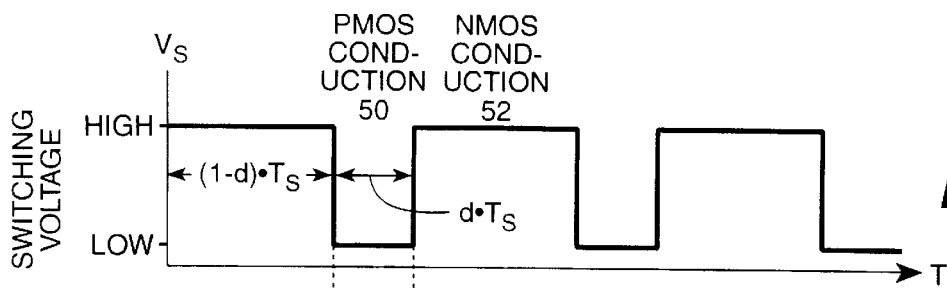
FIG._3
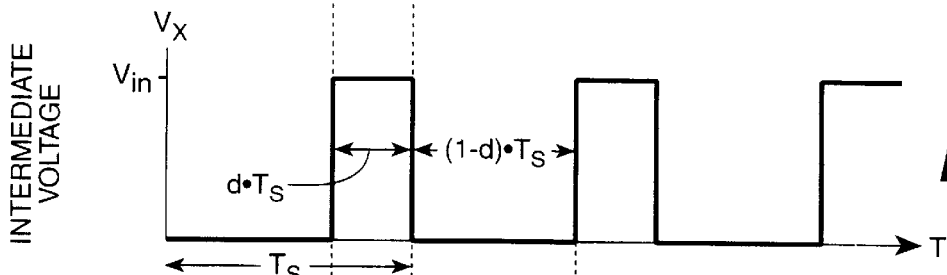
FIG._4
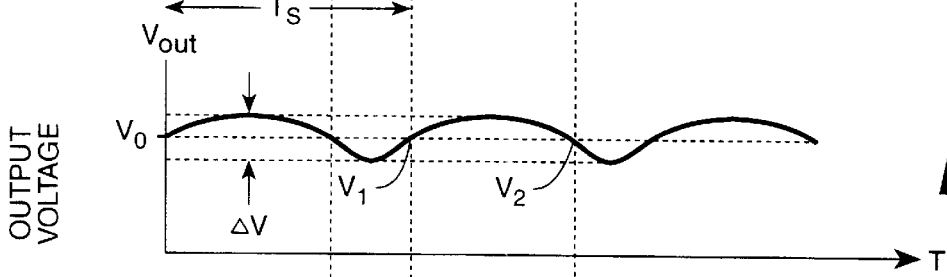
FIG._5
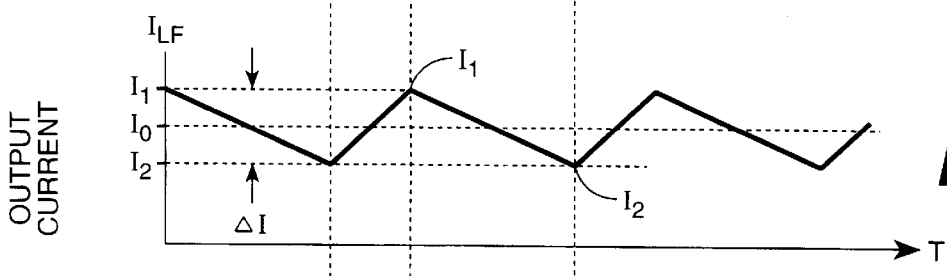
FIG._6
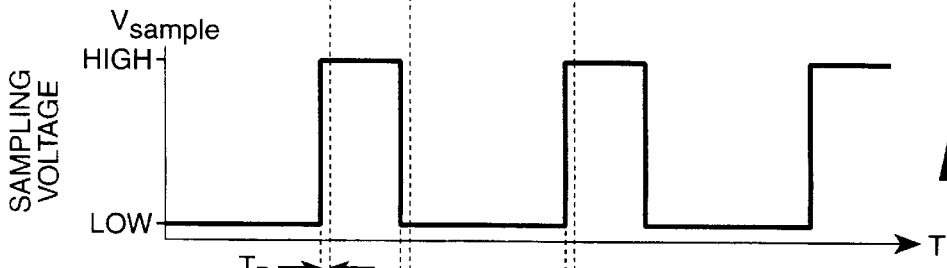
FIG._7
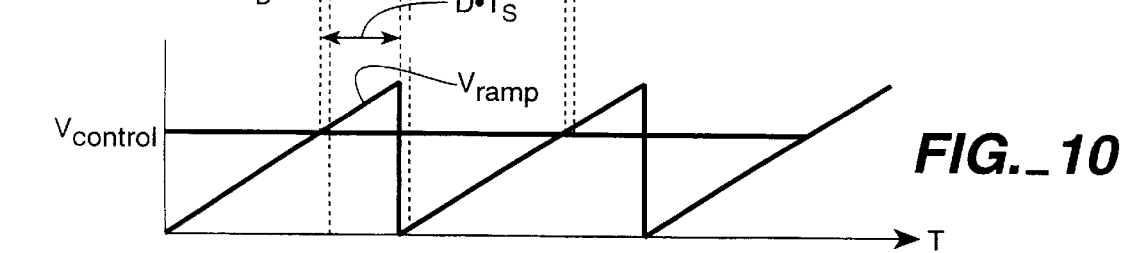
FIG._10

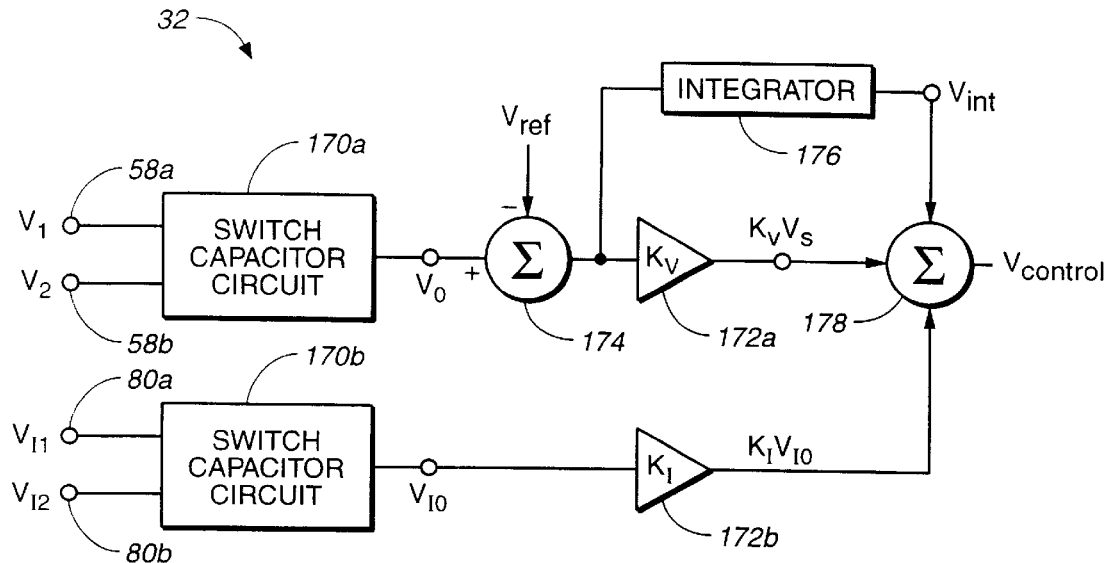
FIG._9
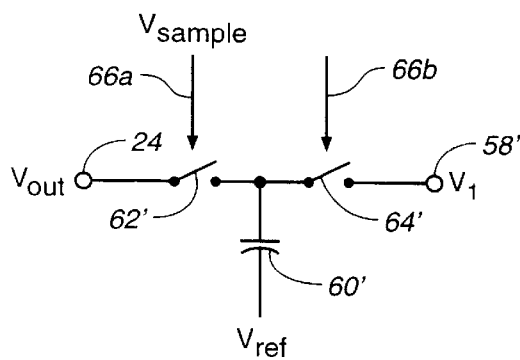
FIG._11A
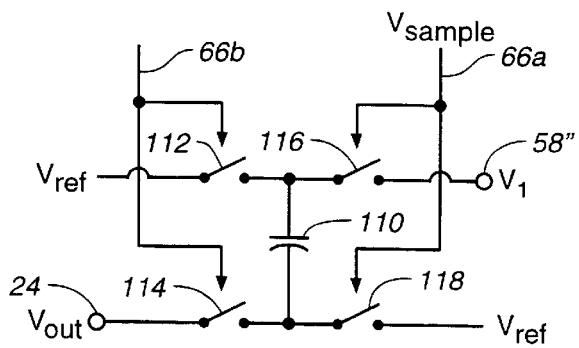
FIG._11B

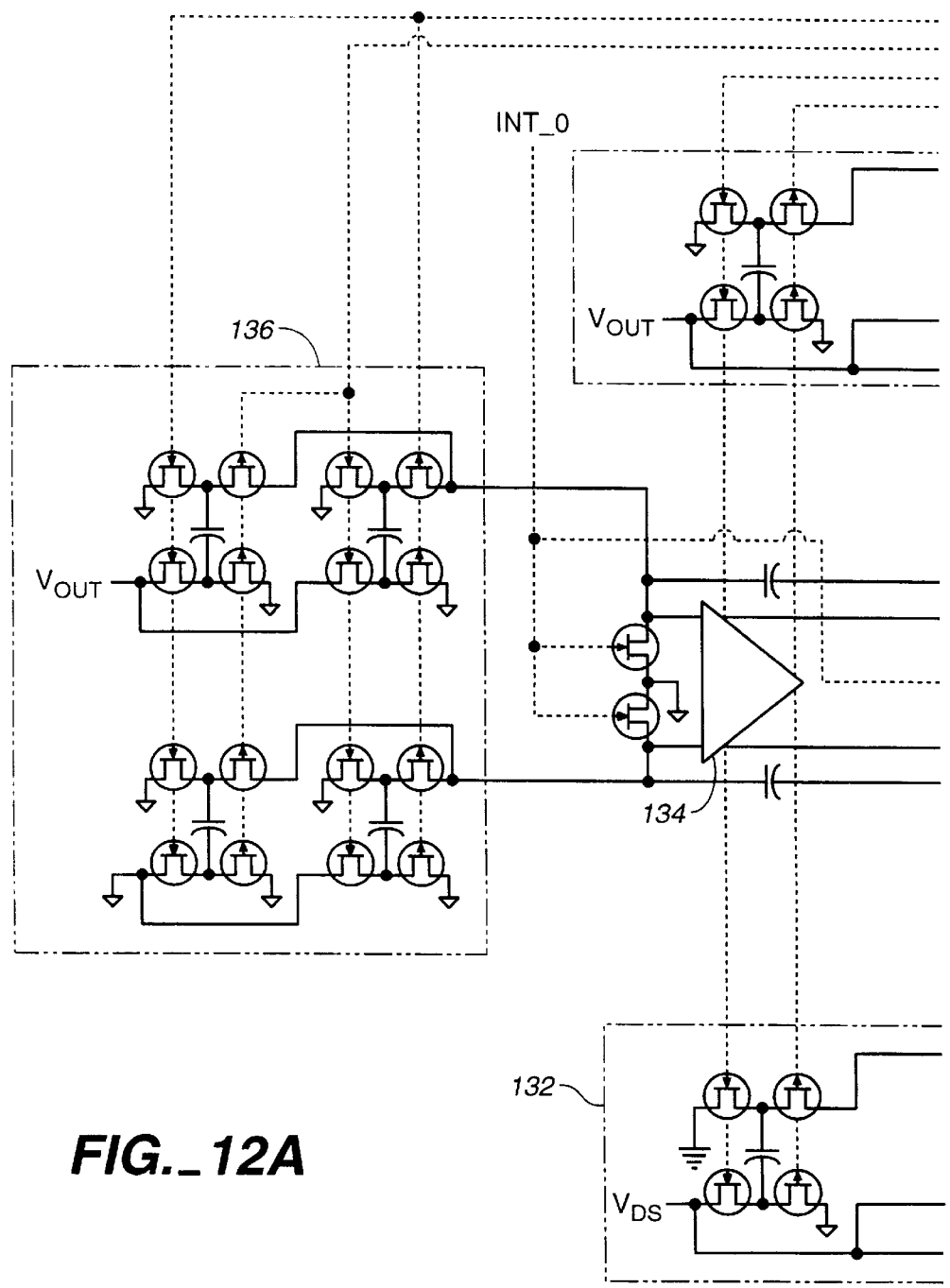
FIG._12A
FIG._12
FIG._12A | FIG._12B

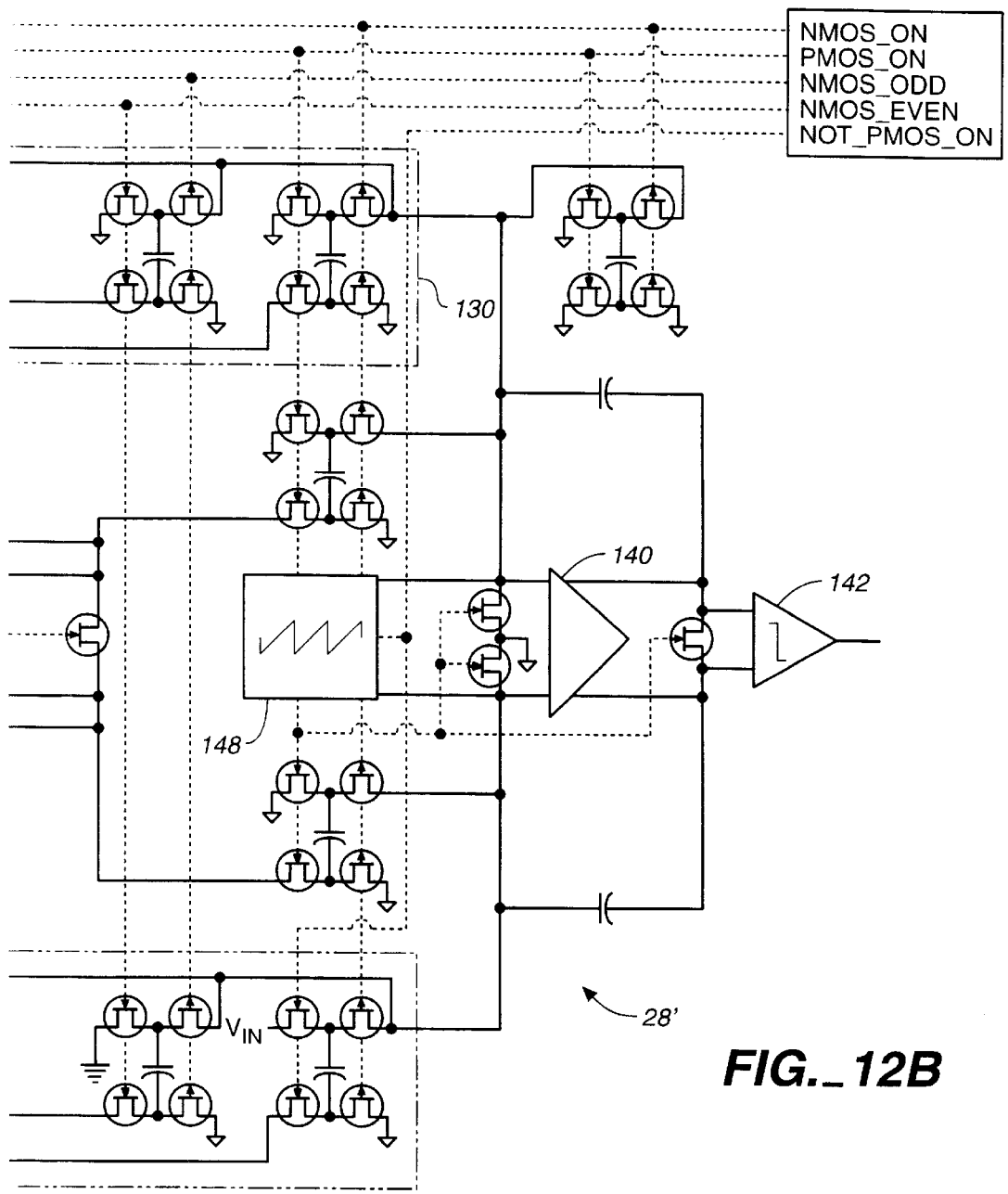
FIG._12B

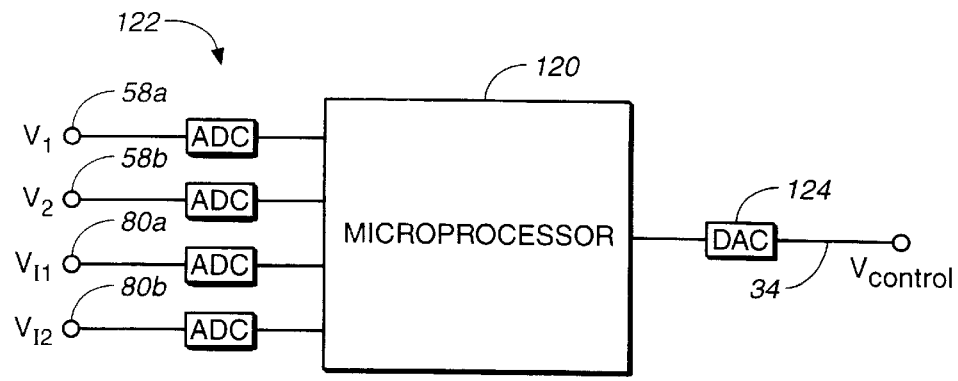
FIG._13
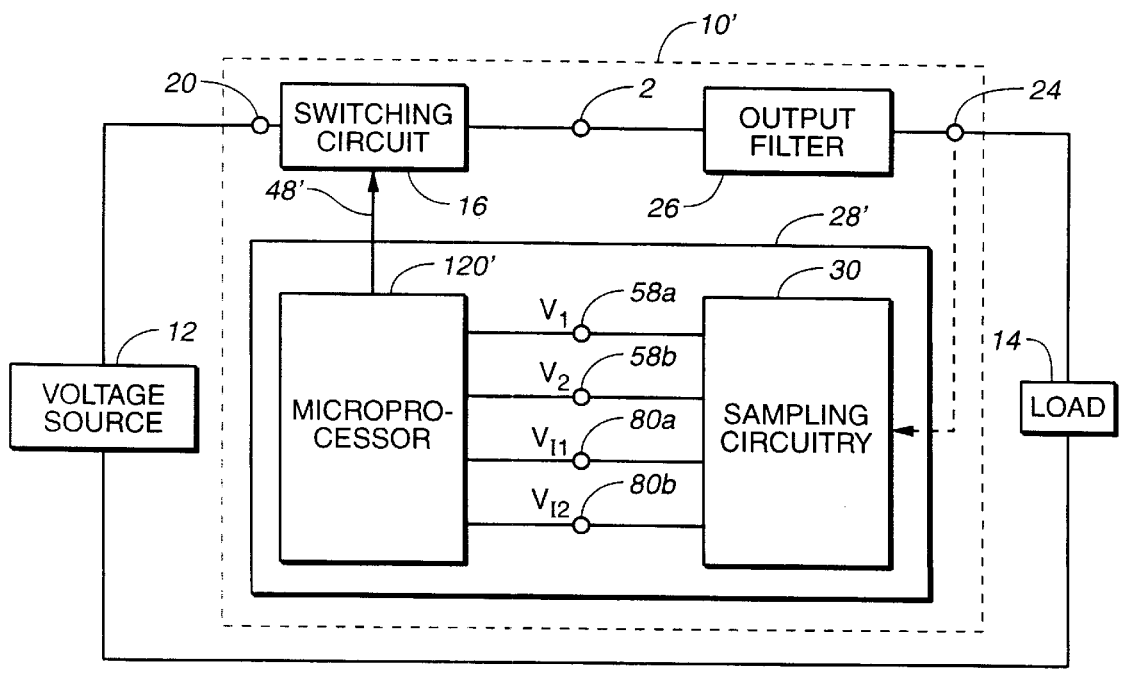
FIG._14

DISCRETE-TIME SAMPLING OF DATA FOR USE IN SWITCHING REGULATIONS

This is a continuation application of U.S. application Ser. No. 08/991,394, filed Dec. 16, 1997 now U.S. Pat. No. 6,020,729.

BACKGROUND

The present invention relates generally to voltage regulators, and more particularly to control systems for switching voltage regulators.

Voltage regulators, such as DC to DC converters, are used to provide stable voltage sources for electronic systems. Efficient DC to DC converters are particularly needed for battery management in low power devices, such as laptop notebooks and cellular phones. Switching voltage regulators (or simply "switching regulators") are known to be an efficient type of DC to DC converter. A switching regulator generates an output voltage by converting an input DC voltage into a high frequency voltage, and filtering the high frequency input voltage to generate the output DC voltage. Specifically, the switching regulator includes a switch for alternately coupling and decoupling an unregulated input DC voltage source, such as a battery, to a load, such as an integrated circuit. An output filter, typically including an inductor and a capacitor, is coupled between the input voltage source and the load to filter the output of the switch and thus provide the output DC voltage. The switch is typically controlled by a pulse modulator, such as a pulse width modulator or a pulse frequency modulator, which controls the switch. A feedback circuit generates a control signal which controls the duty cycle of the pulse modulator in order to maintain the output voltage at a substantially uniform level.

In traditional switching regulators, the feedback controller continuously measures the output voltage and uses this measurement to continuously generate a control signal for the pulse modulator. Such a continuous feedback controller operates using analog circuits, such as resistors, capacitors and op-amps. Unfortunately, these analog circuits are expensive and/or difficult to fabricate as integrated circuits. Specifically, special techniques are needed to fabricate resistors in semiconductor devices. In addition, these analog circuits do not easily interface with any digital circuits that may be fabricated in the same semiconductor device.

SUMMARY

In one aspect, the invention is directed to a voltage regulator having an input terminal to be coupled to an input voltage source and an output terminal to be coupled to a load. The voltage regulator includes a power switch to alternately couple and decouple the input terminal to the output terminal with a variable duty cycle, a filter disposed between the input terminal and the output terminal to provide a substantially DC voltage at the output terminal, a sampling circuit to make measurements of an electrical characteristic of the voltage regulator at discrete moments of time, and a feedback circuit coupled to the sampling circuit and the power switch, the feedback circuit configured to use the measurements to control the duty cycle to maintain the DC voltage substantially constant.

Implementations of the invention may include the following. The electrical characteristic may be a voltage at the output terminal or a current passing through the filter. The sampling circuit may include a capacitor, a first sampling switch connecting the capacitor to the output terminal, and a second sampling switch connecting the capacitor to the feedback circuit, so that the measurement is made when the first sampling switch opens, is stored as a charge in the capacitor, and is provided to the feedback circuit when the second sampling switch closes. Alternately, the sampling circuit may include a capacitor, a first sampling switch connecting a first plate of the capacitor to a first terminal of the power switch, a second sampling switch connecting a second plate of the capacitor to a second terminal of the power switch, and a third sampling switch connecting the capacitor to the feedback circuit, so that the measurement is made when the first and second sampling switches open, is stored as a charge in the capacitor, and is provided to the feedback circuit when the third sampling switch closes. The sampling circuit may make the measurement just prior to the power switch opening and/or closing. The sampling circuit may make a first measurement of the electrical characteristic when the power switch is closed and make a second measurement of the electrical characteristic when the power switch is open. The feedback circuit may use an average of the first and second measurements to control the duty cycle. The sampling circuitry may include a capacitor, a first sampling switch connecting the capacitor to an electrical path between the input terminal and the output terminal, and a second sampling switch connecting the capacitor to the feedback circuit. The second sampling switch may be configured to close when the first sampling switch open, and the first sampling switch may be configured to open just before the power switch opens and/or closes. The power switch may be driven by a switching voltage waveform and the sampling switches may be driven by a sampling voltage waveform, and the voltage regulator may further include a timing circuit to delay the switching voltage waveform relative to the sampling voltage waveform, e.g., by approximately the time constant delay of the sampling circuit. The feedback circuit may generate a control signal, and the voltage regulator may further include a pulse modulator connected to the feedback circuit and the power switch to set the duty cycle in response to the control signal. The feedback circuit may include one or more switched-capacitor circuits coupled to the sampling circuit to convert the measurement into a charge and to generate the control signal from the charge. The sampling circuit may include an analog-to-digital converter (ADC) coupled to the sampling circuit to convert the measurement into a digital signal, and a processor coupled to the ADC to generate the control signal from the digital signal. The power switch may include a first switch connecting the input terminal to an intermediate terminal and a rectifier, such as a second switch, connecting the intermediate terminal to ground, and the output filter may be connected between the intermediate terminal and the output terminal.

In another aspect, the invention is directed to a voltage regulator having an input terminal to be coupled to an input voltage source and an output terminal to be coupled to a load. The voltage regulator includes a power switch to alternately couple and decouple the input terminal to the output terminal with a variable duty cycle, a filter disposed between the switch and the output terminal to provide a substantially DC voltage at the output terminal, a sampling circuit to make a measurement of a current passing through the output filter, and a feedback circuit connected to the sampling terminal and the power switch configured to use the measurement to control the duty cycle to maintain the DC voltage at a substantially constant level. The sampling circuit includes a capacitor, a first sampling switch connecting a first plate of the capacitor to a first terminal of the power switch, a second sampling switch connecting a second plate of the capacitor to a second terminal of the power switch, and a third sampling switch connecting the capacitor to a sampling terminal.

Advantages of the invention may include the following. The feedback controller of the voltage regulator uses a discrete-time data sampling system to control the pulse modulator. Such a feedback controller may be implemented using digital and/or switched-capacitor based circuitry, and may be fabricated using known processes suitable for complimentary metal oxide semiconductor (CMOS) fabrication techniques. This reduces the number of discrete (off-chip) components in the controller. The invention permits the feedback controller to be implemented using an analog-to-digital converter and a micro-processor so that the duty cycle of the switch may be controlled by a software-implemented algorithm. In addition, the use of digital designs and traditional CMOS fabrication techniques permit the voltage regulator to be constructed more cheaply. Furthermore, the discrete times at which the voltage and current are sampled may be selected to provide a high accuracy and a minimum amount of switching noise.

BRIEF DESCRIPTION OF THE DRAWINGS

FIG. 1 is a block diagram of a switching regulator in accordance with the present invention.

FIG. 2 is a schematic circuit diagram of one embodiment of the switching regulator of FIG. 1.

FIG. 3 is a timing diagram showing the switching voltage from the pulse modulator of the switching regulator of FIG. 2.

FIG. 4 is a timing diagram showing the intermediate voltage at the intermediate terminal of the switching regulator of FIG. 2.

FIG. 5 is a timing diagram showing the output voltage at the output terminal of the switching regulator of FIG. 2.

FIG. 6 is a timing diagram showing the current through the output filter of the switching regulator of FIG. 2.

FIG. 7 is a timing diagram showing the sampling voltage to drive the sampling circuits of the switching regulator of FIG. 2

FIG. 8 is a schematic circuit diagram showing a discrete-time current-sampler from the feedback controller of the switching regulator of FIG. 2.

FIG. 9 is a schematic diagram showing a feedback control signal generator from the feedback controller of the switching regulator of FIG. 2.

FIG. 10 is a timing diagram of the ramp voltage and control voltage input to the pulse modulator of the switching regulator of FIG. 2.

FIGS. 11A and 11B are schematic circuit diagrams showing alternate embodiments of the discrete-time voltage sampler.

FIG. 12 is a schematic diagram of an alternate embodiment of a feedback controller.

FIG. 13 is a schematic diagram of an another alternate embodiment of a feedback controller.

FIG. 14 is a schematic diagram of another embodiment of the switching regulator of FIG. 1.

DETAILED DESCRIPTION

Referring to FIG. 1, a switching regulator 10 is coupled to an unregulated DC input voltage source 12, such as a battery, by an input terminal 20. The switching regulator 10 is also coupled to a load 14, such as an integrated circuit, by an output terminal 24. The switching regulator 10 serves as a DC-to-DC converter between the input terminal 20 and the output terminal 24. The switching regulator 10 includes a switching circuit 16 which serves as a power switch for alternately coupling and decoupling the input terminal 20 to an intermediate terminal 22. The switching circuit 16 includes a rectifier, such as a switch or diode, coupling the intermediate terminal 22 to ground. The switching regulator also includes a pulse modulator 18 for controlling the operation of the switching circuit 16. The pulse modulator 18 causes the switching circuit 16 to generate an intermediate voltage having a rectangular waveform at the intermediate terminal 22. Although the pulse modulator 18 and the switching circuit 16 will be illustrated and described below as a pulse width modulator, the invention is also applicable to various pulse frequency modulation schemes.

The intermediate terminal 22 is coupled to the output terminal 24 by an output filter 26. The output filter 26 converts the rectangular waveform of the intermediate voltage at the intermediate terminal 22 into a substantially DC output voltage at the output terminal 24. Although the switching circuit 16 and the output filter 26 will be illustrated and described below for a buck converter topology, the invention is also applicable to other voltage regulator topologies, such as a boost converter or a buck-boost converter topology.

The output voltage is regulated, or maintained at a substantially constant level, by a feedback circuit 28. The feedback circuit 28 includes sampling circuitry 30 which measures the output voltage and the current passing through the output terminal 24 at discrete times during each cycle of the switching circuit 16. The measured voltage and current are input to a feedback control signal generator 32. The feedback control signal generator 32, in turn, generates a control voltage on a duty cycle control line 34 to control the pulse modulator 18. The sampling circuitry 30 and the feedback control signal generator 32 may be constructed utilizing entirely digital and switched-capacitor based components. Thus, most of the switching regulator 10, including the switching circuit 16, the pulse modulator 18, and the feedback circuit 28, may be implemented or fabricated on a single chip utilizing conventional CMOS techniques. Each of the elements in the switching regulator 10, i.e., the switching circuit 16, the pulse modulator 18, the output filter 26, the sampling circuitry 30, and the feedback control signal generator 32, will be discussed in greater detail below.

Referring to FIG. 2, the switching circuit 16 and the output filter 26 are configured in a buck converter topology. Specifically, the switching circuit 16 includes a switch, such as a first transistor 40 having a source connected to the input terminal 20 and a drain connected to the intermediate terminal 22, and a rectifier, such as a second transistor 42 having a source connected to ground and a drain connected to the intermediate terminal 22. The first transistor 40 may be a P-type MOS (PMOS) device, whereas the second transistor 42 may be an N-type MOS (NMOS) device. Alternately, the second transistor 42 may be replaced or supplemented by a diode to provide rectification. Also, both transistors may be NMOS devices. The first and second transistors 40 and 42 may be driven by a switching voltage $V_s$ on switching lines 48a and 48b.

Referring to FIG. 3, the pulse modulator generates a switching voltage $V_s$ having a rectangular waveform. The switching voltage $V_s$ has a frequency, $F_s$, of $1/T_s$ and a variable duty cycle, d, which is controlled by the feedback control signal generator. The duty cycle d is percentage of each period $T_s$ that the switching voltage is on, i.e., low. The frequency $F_s$ of the switching voltage may be in the range of about ten kilohertz to several megahertz. When the switching voltage $V_s$ is low, the first transistor is closed and the second transistor is open (PMOS conduction period 50), whereas if the switching voltage $V_s$ is high, the first transistor is open and the second transistor is closed (NMOS conduction period 52). Thus, during the PMOS conduction period 50, the intermediate terminal is connected to the input terminal, whereas during the NMOS conduction period 52, the intermediate terminal is connected to ground. Although not illustrated, the switching voltages on the switching lines 48a and 48b may be triggered by conventional techniques so that the PMOS and NMOS conduction periods 50 and 52 are separated by a dead time to ensure that both switches are not open simultaneously.

Referring to FIG. 4, the resulting intermediate voltage $V_x$ at the intermediate terminal is a rectangular waveform having a variable duty cycle d (the percentage of the cycle in which the intermediate terminal is connected to the input terminal) and a constant frequency $F_s$.

Returning to FIG. 2, the intermediate voltage $V_x$ is filtered by the output filter 26 to generate an output voltage $V_{out}$ at the output terminal 24. The output filter 26 includes an inductor 44 connected between the intermediate terminal 22 and the output terminal 24 and a capacitor 46 connected in parallel with the load 14. During the PMOS conduction period, the voltage source 12 supplies energy to the load 14 and the inductor 44 via the first transistor 40. On the other hand, during the NMOS conduction period, the energy is supplied by the inductor 44. The resulting output voltage $V_{out}$ is a substantially DC voltage. The average voltage $V_O$ of the output voltage $V_{out}$ is given by the product of the input voltage $V_{in}$ and the duty cycle d, i.e., $V_o = d \times V_{in}$. The average output current $I_o$ passing through the output terminal 24 is given by the average voltage $V_o$ divided by the effective resistance $R_o$ of the load, i.e., $I_o = V_o/R_o$.

Unfortunately, the actual output voltage $V_{out}$ is not exactly equal to the average voltage $V_o$. Referring to FIG. 6, the output voltage $V_{out}$ will include a ripple $\Delta V$ which is given by the following equation:

$$\Delta V \approx \frac{V_0 \cdot (1-d)}{8 \cdot L_f \cdot C_f \cdot f_s^2}$$

where d is the duty ratio, $L_f$ is the inductance of the inductor 44, $C_f$ is the capacitance of the capacitor 46, and $f_s$ is the switching frequency.

Similarly, the actual output current $I_{out}$ is not exactly equal to the average current $I_o$. Referring to FIG. 6, the output current $I_{out}$ will be a triangular waveform with a period $T_s$ and a peak-to-peak ripple $\Delta I$ which has its maximum and minimum peaks equidistant from the average load current $I_O$. The peak-to-peak ripple $\Delta I$ is given by the following equation:

$$\Delta I = \frac{V_0 \cdot (1-d)}{L_f \cdot f_s}$$

where d is the duty cycle, $L_f$ is the inductance of the inductor 44, and $f_s$ is the switching frequency.

As previously discussed, the switching regulator includes sampling circuitry to measure the output voltage $V_{out}$ and the output current $I_{out}$. The sampling circuitry measures the output voltage at one or more discrete times during each cycle of the switching circuit. The sampling circuitry also measures the output current at one or more discrete times during each cycle of the switching circuit. However, since the output current cannot be measured directly, the sampling circuitry may actually measure a voltage difference which is representative of output current. Nevertheless, some of the description which follows is phrased as if the current were measured directly.

The feedback control signal generator uses the measured voltages and currents to determine the average output voltage $V_o$ and average output current $I_o$. The average output voltage $V_O$ and average output current $I_o$ are used to control the duty cycle of the power switch. It should be noted that the feedback circuit may use the voltage and current measurements to control the power switch without the intermediate step of determining the average values. Some of the description which follows is phrased as if the average values are calculated and provided as separate signals, although, as noted, this is not necessarily the case.

Referring to FIGS. 4, 5 and 6, the maximum output current $I_{out}$ is reached at the end of the PMOS conduction period 50 and the minimum output current $I_{out}$ is reached at the end of the NMOS conduction period 52. In addition, the output voltage $V_{out}$ passes through its average value at the end of the PMOS and NMOS conduction periods 50 and 52. Therefore, in order to estimate the average output voltage $V_o$, a firt voltage measurement $V_1$ is made at the end of the PMOS conduction prriod 50, a second voltage measurement $V_2$ of the output voltage is made at the end of the NMOS conduction period 52, and the two measurements are averaged. Similarly, to estimate the average output current $I_o$, a first representative measurement $V_{11}$ of the current $I_1$ is made at the end of the PMOS conduction period 50, a second current measurement $V_{12}$ representative of the current $I_2$ is made at the end of the NMOS conduction period 52, and the two measurements are averaged. Because switching noise occurs when the transistors are switched on or off, if the measurements are made just before the switching voltage $V_s$ changes, there is a minimum amount of switching noise in the average current and voltage.

Returning to FIG. 2, a significantly simplified voltage sampler is shown. Current sampling is not shown explicitly in FIG. 2; it will be explained with reference to FIG. 8. The sampling circuitry 30 includes two voltage sampling capacitors 60a and 60b that are connected to the output terminal 24 by two voltage sampling switches 62a and 62b, respectively. The voltage sampling capacitors 60a and 60b may be connected by additional sampling switches 64a and 64b to the feedback control signal generator 32 via voltage sampling terminals 58a and 58b. The sampling switches may be configured so that switches 64a and 62b are closed when switches 62a and 62b are open, and vice-versa While switch 62a is closed and switch 64a is open, current flows from the output terminal 24 into voltage sampling capacitor 60a. However, when switch 62a is opened and switch 64b is closed, the output voltage stored in voltage sampling capacitor 60a in the form of a charge is transferred onto voltage sampling terminal 58a to provide the first voltage measurement $V_1$. Similarly, while switch 62b is closed and switch 64b is open, current flows into voltage sampling capacitor 60b, but when switch 62b is opened and switch 64b is closed, the output voltage stored in voltage sampling capacitor 60b is transferred onto voltage sampling terminal 58b to provide the second voltage measurement $V_2$. Sampling switches 62a, 62b, 64a and 64b are driven by a sampling voltage $V_{sample}$ on sampling control lines 66a and 66b.

Referring to FIG. 7, the sampling voltage waveform $V_{sample}$ switches between high and low states just before the end of the PMOS conduction cycle and the NMOS conduction cycle. Although not shown explicitly, the sampling voltage on control lines 66a and 66b may be offset so that switches 62a, 62b and 64a, 64b are not open simultaneously.

Returning to FIG. 2, the switching lines 48a and 48b and the sampling control lines 66a and 66b may be connected to a timing circuit 68. The timing circuit 68 delays the switching voltage waveform $V_s$ relative to the sampling voltage waveform $V_{sample}$ to ensure that sampling occurs just before the transistors 40 and 42 flip in order to minimize noise. Thus, voltage sampling terminal 58a provides the first voltage $V_1$ measured at the end of the PMOS conduction period, and voltage sampling terminal 58b provides the second voltage $V_2$ measured at the end of the NMOS conduction period. The sampling voltage waveform $V_{sample}$ may be offset from the switching voltage waveform $V_s$ by a delay $T_D$ which is approximately equal to the time constant delay of the sampling circuit, i.e., about the time required by the sampling circuitry 30 to take the voltage and current measurements. The delay $T_D$ may be on the order of several nanoseconds. Preferably, the delay $T_D$ is larger than the time required to sample voltage and current.

As previously mentioned, sampling circuitry 30 also measures the output current $I_{out}$ at the end of the PMOS conduction period and the end of the NMOS conduction period. The current passing through the output terminal 24 is equal to the inductor current $I_{LF}$ passing through the inductor 44. However, the inductor current $I_{LF}$ cannot be measured directly; it must be inferred from a voltage measurement taken across a resistive element through which the current passes.

The sampling circuitry 30 includes a current sampler, one implementation of which is shown in FIG. 8. In this implementation, the current sampler uses the first and second transistors 40 and 42 as the resistive elements for the measurement of the inductor or output current. For each transistor 40 and 42, the sampling circuitry includes four current sampling switches 70, 72, 74 and 76, and a current sampling capacitor 78. The top plate of the current sampling capacitor 78 is connected to the source of the transistor (i.e., the input terminal 24 for the first transistor 40 and ground for the second transistor 42) by the first current sampling switch 70. Similarly, the bottom plate of the current sampling capacitor 78 is connected to the drain of the transistor (i.e., the intermediate terminal 22 for both the first and second transistors 40 and 42) by the second current sampling switch 72. The top plate of the current sampling capacitor 78 is coupled to a current sampling terminal 80 by the third current sampling switch 74, and the bottom plate of the current sampling capacitor 78 is connected to a reference voltage $V_{REF}$ by the fourth current sampling switch 76. The first and second switches 70 and 72 open simultaneously at the end of the conductive period of the transistor to which they are attached or connected, whereas the third and fourth switches 74 and 76 close when the first and second switches 70 and 72 open. The control signals to activate the switches 70, 72, 74 and 76 may be generated on timing lines 82a and 82b by the timing circuit 68 in a manner similar to the control signals for the sampling switches. Thus, at the end of the conduction period to which the current sampler is connected, a voltage representing the inductor current is supplied to the current sampling terminal 80. Two current sampling circuits provide the voltage measurements $V_{11}$ and $V_{12}$ which are representative of the currents $I_1$ and $I_2$ respectively.

The voltage and current measurements may be made at a variety of discrete times. For example, a single current measurement could be made at the middle of the NMOS conduction period. However, by sampling the voltage and current just prior to the end of the conduction periods of the first transistor 40 and the second transistor 42, the sampled signals provide the best estimate for the average values of the inductor current and capacitor voltage and are taken when the switching noise is at a minimum.

Referring to FIG. 9, the sampled data $V_1$, $V_2$, $V_{11}$, and $V_{12}$ on sampling terminals 58a, 58b, 80a, and 80b are supplied to the feedback control signal generator 32. The feedback control signal generator uses these signals to generate a control voltage $V_{control}$ on the duty cycle control line 34. This control voltage is used by the pulse generator 18 to modulate the duty cycle of the switching circuit 16 to maintain the average voltage $V_o$ at the output terminal at a substantially constant level. $V_o$ andand 172a.

The feedback control signal generator can determine $V_{control}$ according to various algorithms. For example, sampling terminals 58a, 58b and 80a, 80b may be connected to switch capacitor circuits 170a and 170b, respectively, to effectively combine and average the sampled voltages $V_1$, $V_2$ and $V_{11}$, $V_{12}$ to generate the average values $V_o$ and $V_{10}$, respectively. The averaged value $V_{10}$ is scaled by a constant $K_1$ by amplifier 172b respectively. The averaged voltage $V_o$ is compared to a reference voltage $V_{ref}$ by a first summing circuit 174. The difference between the averaged voltage $V_o$ and the reference voltage $V_{ref}$ is scaled by a constant $K_v$ by amplifier 172a. In addition, the difference between the averaged voltage $V_o$ and the reference voltage $V_{ref}$ is integrated by an integrator 176 to generate an integrated voltage $V_{int}$. Finally, the three inputs $K_vV_o$, $K_IV_O$ and $V_{int}$ are combined by a second summing circuit 178 to generate the control signal $V_{control}$.

Returning to FIG. 2, a significantly simplified pulse modulator 18 is shown. The pulse modulator 18 converts the control voltage $V_{control}$ on the duty cycle control line 34 into a timing voltage waveform on a timing line 104. The pulse modulator 18 includes a ramp generator 100 and a comparator 102. Referring to FIG. 10, the output of the ramp generator is a saw tooth wave having a frequency of $1/T_s$, a minimal voltage of $V_m$ and a maximum voltage of $V_{max}$. The comparator compares the control voltage $V_{control}$ to the ramp voltage $V_{ramp}$ and outputs a high voltage on the timing line if $V_{control}$ is greater than $V_{ramp}$, and a low voltage on the timing line if $V_{control}$ is less than $V_{ramp}$. Returning to FIG. 2, the timing voltage waveform on the timing line 104 is sent to the timing circuit 68. The timing circuit 68 may output the timing voltage waveform sampling voltage $V_{sample}$ on the sampling control lines 66a and 66b. The timing circuit 68 may generate a switching voltage $V_s$ on the switching lines 48a and 48b which is offset from the sampling voltage waveform $V_{sample}$ by a small delay $T_D$. Thus, the sampling switches (e.g., switches 62a, 62b, 64a and 64b) are triggered slightly before the transistors 40 and 42 in the switching circuit 16.

If $V_{control}$ increases, the duty cycle D of switching voltage $V_s$ decreases. On the other hand, if control voltage $V_{control}$ decreases, duty cycle D increases. Therefore, the feedback circuit 28 is able to measure the output voltage $V_{out}$ and inductor current $I_{LF}$ at discrete times, use this data to calculate the average voltage $V_O$ and the average current $I_O$, and use the average current and voltage to modulate the duty cycle of switching voltage $V_s$ to ensure that the output voltage remains substantially constant. Since all of the components of the feedback controller may be designed using switches and capacitors, most of the switching regulator may be fabricated utilizing conventional CMOS techniques. In addition, because the voltage and current are sampled at discrete times, the system is more compatible with conventional digital designs such as digital timing circuits.

Referring to FIG. 11A, in another embodiment, a voltage sampling capacitor 60' is connected to a reference voltage $V_{REF}$ rather than to ground. This reduces the amount of charge stored on the capacitor.

Referring to FIG. 11B, in another embodiment, sampling circuitry 30" is constructed with a bottom plate sampling topology. The bottom plate of a voltage sampling capacitor 60" is connected to the output terminal 24 by a first sampling switch 112 and to a reference voltage $V_{ref}$ by a second sampling switch 114. The top plate of the voltage sampling capacitor 60" is connected to the same reference voltage $V_{ref}$ by a third sampling switch 116 and to a voltage sampling terminal 58" by a fourth sampling switch 118. The first switch 112 and the third switch 116 are closed during the conduction period before the voltage measurement, whereas the second switch 114 and the fourth switch 118 are open during the conduction period before the voltage measurement. Bottom plate sampling reduces the sampling error caused by parasitic capacitance and charge injection from the switches.

One possible implementation of the feedback circuitry 28', including sampling circuitry and a feedback control signal generator, is shown in FIG. 12. The feedback circuitry 28' includes voltage sampling cells 130 to measure the output voltages $V_{out}$, current sampling cells 132 to measure a voltage $V_{Ds}$ which represents the current passing through the inductor, and an integrator 134 which is associated with voltage sampling cells 136 to generate an integral of the difference between the difference between the measured and desired output voltage. The voltages from the voltage sampling cells 130, the current sampling cells 132, the integrator 134, and a ramp generator 138, are combined by a main summing amplifier 140. The output of the main summing amplifier 140 is sent to a comparator 142 which generates the sampling voltage. The elements in the feedback circuitry are driven by a timing signal generator 144 which generators the following signals: nmos_on/phi_nmos is high when the NMOS transistor is on; pmos_on/phi_pmos is high when the PMOS transistor is on; not_pmos_on is high when the PMOS transistor is off; nmos_even is high every other time the NMOS transistor is on; and nmos_odd is high every other time the NMOS transistor is on, but is in quadrature with the nmos_even signal. All of these signals switch low just before the gate drive buffers for their respective transistors begin switching. The voltage sampling cells include two sample cells for measuring the voltage at the end of the NMOS conduction period. One sampling cell is connected to the main summing amplifier while the other sampling cell is sampling. Thus, the main summing amplifier can use the NMOS sample take in the previous period to calculate the duty cycle to be used in the current period. Although the switchs are illustrated as JFET transisitors, they may be implemented as NMOS and PMOS transistors.

In brief, the feedback circuitry 28' calculates the duty cycle according to the following equation:

$$DutyCycle =$$

$$\frac{f}{2I_{PWM}}\left(C_V(V_{ERROR}^{PMOS} + V_{ERROR}^{NMOS}) + (C_{PMOS}V_{DS}^{PMOS} + C_{NMOS}V_{DS}^{NMOS}) + \right.$$

$$\left. C_I \frac{C_S}{C_F} \sum_{0}^{N} (V_{ERROR}^{PMOS} + V_{ERROR}^{NMOS}) \right)$$

where f is the sampling frequency, $I_{PWM}$ is the current from each side of the ramp generator, CV is the capacitance of the voltage sampling capacitor (e.g., 2.8 pF), $C_{PMOS}$ is the capacitance of the current sampling capacitor for the PMOS transistor (e.g., 4 pF), $C_{NMOS}$ is the capacitance of the current sampling capacitor for the NMOS transistor (e.g., 8 pF), $C_I$ is the capacitance of the output sampling capacitor in the integrator (e.g., 0.8 pF), $C_s$ is the capacitance of the sampling capacitor (e.g., 1 pF), $C_F$ is the capacitance of the integrating capacitor (e.g., 3.5 pF), $V_{DS}^{PMOS}$ is the voltage measurement which is representative of the output current during the PMOS conduction period, $V_{ERROR}^{PMOS}$ is the output voltage measurement during the PMOS conduction period, $V_{ERROR}^{NMOS}$ is the output voltage measurement during the NMOS conduction period, and $V_{DS}^{NMOS}$ is the voltage measurement which is representative of the output current during the NMOS conduction period.

Referring to FIG. 13, in another embodiment, the analog components of the feedback control signal generator 32 are replaced with a microprocessor 120. Specifically, sampling terminals 58a, 58b, 80a and 80b are each connected to an analog-to-digital converter (ADC) 122 to convert the sampled voltage or current into a digital signal which is sent to the microprocessor 120. The microprocessor 120 may be a combination of hardware, software, and firmware. The microprocessor 120 calculates a duty cycle signal which is converted by a digital-to-analog converter (DAC) 124 into a control voltage $V_{control}$. The microprocessor 120 may be programmed to calculate the average voltage $V_0$ and the average current $V_{10}$ from the sampled measurements $V_1, V_2, V_{11}$ and $V_{12}$. Then, the microprocessor 120 may calculate a new control voltage from the average voltage $V_0$ and average current $V_{10}$. For example, the microprocessor may store a control voltage used from the previous cycle, $V_{old}$, and calculate a new control voltage $V_{new}$ according to a preset equation.

Referring to FIG. 14, in another embodiment, the signal control generator and pulse modulator functions are combined and implemented directly by the microprocessor 120'. The microprocessor 120' is connected directly to switching line 48. The microprocessor may be configured to calculate a duty cycle from the average voltage $V_O$ and average current $I_O$.

What is claimed is:

1. A method of operating a voltage regulator having an input terminal to be coupled to an input voltage source and an output terminal to be coupled to a load, comprising:
    alternately coupling and decoupling the input terminal to the output terminal with a power switch;
    filtering a current between the input terminal and the output terminal to provide a substantially DC voltage at the output terminal;
    capturing a measurement of an electrical characteristic of the voltage regulator at a discrete moment of time with a sampling circuit;
    receiving the captured measurement with a feedback circuit coupled to the sampling circuit and the power switch; and
    using the measurement to control the power switch to maintain the DC voltage substantially constant.

2. The method of claim 1, wherein the electrical characteristic is a voltage at the output terminal.

3. The method of claim 2, wherein capturing the measurement includes closing a first sampling switch connecting a capacitor to the output terminal, storing a charge on the capacitor, opening the first sampling switch to capture the measurement, and closing second sampling switch connecting the capacitor to the feedback circuit to provide the measurement to the feedback circuit.

4. The method of claim 1, wherein the electrical characteristic is a current passing through the filter.

5. The method of claim 4, wherein capturing the measurement includes closing a first sampling switch connecting a first plate of a capacitor to a first terminal of the power switch, closing a second sampling switch connecting a second plate of the capacitor to a second terminal of the power switch, storing a charge on the capacitor, opening the first sampling switch and the second sampling switch to capture the measurement, and closing a third sampling switch connecting the capacitor to the feedback circuit to provide the measurement to the feedback circuit.

6. The method of claim 1, wherein the measurement is captured just prior to the power switch closing.

7. The method of claim 1, wherein the measurement is captured just prior to the power switch opening.

8. The method of claim 1, wherein a first measurement of the electrical characteristic is captured when the power switch is closed and a second measurement of the electrical characteristic is captured when the power switch is open.

9. The method of claim 8, further comprising averaging the first and second measurements, and using the average to control the power switch.

10. The method of claim 2, wherein capturing the measurement includes closing a first sampling switch connecting a capacitor to an electrical path between the input terminal and the output terminal, storing a charge on the capacitor, opening the first sampling switch to capture the measurement, and closing second sampling switch connecting the capacitor to the feedback circuit to provide the measurement to the feedback circuit.

11. The method of claim 10, further comprising driving the power switch with switching voltage waveform, driving the sampling switches with a sampling voltage waveform, and delaying the switching voltage waveform relative to the sampling voltage waveform.

12. The method of claim 11, wherein the switching voltage waveform is delayed relative to the sampling voltage waveform by approximately the time constant delay of the sampling circuit.

13. The method of claim 1, further comprising generates a control signal with the feedback circuit, and setting the duty cycle in response to the control signal with a pulse modulator that receives the control signal from the feedback circuit.

14. The method of claim 13, further comprising converting the measurement into a charge with one or more switched-capacitor circuits in the feedback circuit, and generating the control signal from the charge.

15. The method of claim 13, further comprising converting the measurement into a digital signal with an analog-to-digital converter (ADC) coupled to the sampling circuit, and generating the control signal from the digital signal with a processor coupled to the ADC.

16. The method of claim 1, wherein alternately coupling and decoupling the input terminal to the output terminal includes connecting the input terminal to an intermediate terminal with a first switch and connecting the intermediate terminal to ground with a rectifier.

17. The method of claim 16, wherein the rectifier is a second switch.

18. A method of operating a voltage regulator having an input terminal to be coupled to an input voltage source and an output terminal to be coupled to a load, comprising:

alternately coupling and decoupling the input terminal to the output terminal with a power switch;

filtering a current between the input terminal and the output terminal to provide a substantially DC voltage at the output terminal;

closing a first sampling switch connecting a capacitor to the output terminal;

storing a charge on the capacitor;

opening the first sampling switch to capture a measurement of a voltage at the output terminal at a discrete moment of time;

closing a second sampling switch connecting the capacitor to the feedback circuit to provide the measurement to the feedback circuit; and using the measurement to control the power switch to maintain the DC voltage substantially constant.

19. A method of operating a voltage regulator having an input terminal to be coupled to an input voltage source and an output terminal to be coupled to a load, comprising:

alternately coupling and decoupling the input terminal to the output terminal with a power switch;

filtering a current between the input terminal and the output terminal to provide a substantially DC voltage at the output terminal;

closing a first sampling switch connecting a first plate of a capacitor to a first terminal of the power switch;

closing a second sampling switch connecting a second plate of the capacitor to a second terminal of the power switch;

storing a charge on the capacitor;

opening the first sampling switch and the second sampling switch to capture a measurement of a voltage across the switch which represents a current flowing through the switch; and using the measurement to control the power switch to maintain the DC voltage substantially constant.

* * * * *

Disclaimer 6,225,795— Anthony J. Stratakos, Fremont; David B. Lidsky, Oakland; William A. Clark, Fremont, all of CA (US). DISCRETE-TIME SAMPLING OF DATA FOR USE IN SWITCHING REGULATIONS. Patent dated May 1, 2001. Disclaimer filed July 29, 2004, by the assignee, Volterra Semiconductor Corporation.

The term of this patent, subsequent to the term of patent number, 6,020,729 has been disclaimed.

*(Official Gazette, November 2, 2004)*

(12) EX PARTE REEXAMINATION CERTIFICATE (8302nd)
United States Patent
Stratakos et al.

(10) Number: US 6,225,795 C1
(45) Certificate Issued: Jun. 7, 2011

(54) DISCRETE-TIME SAMPLING OF DATA FOR USE IN SWITCHING REGULATIONS

(75) Inventors: Anthony J. Stratakos, Fremont, CA (US); David B. Lidsky, Oakland, CA (US); William A. Clark, Fremont, CA (US)

(73) Assignee: Volterra Semiconductor Corporation, Fremont, CA (US)

Reexamination Request:
No. 90/009,402, Feb. 12, 2009

Reexamination Certificate for:
Patent No.: 6,225,795
Issued: May 1, 2001
Appl. No.: 09/481,744
Filed: Jan. 11, 2000

Related U.S. Application Data

(63) Continuation of application No. 08/991,394, filed on Dec. 16, 1997, now Pat. No. 6,020,729.

(51) Int. Cl.
H02M 3/156 (2006.01)
H02M 3/04 (2006.01)

(52) U.S. Cl. ........................... 323/283; 323/284
(58) Field of Classification Search .................. None
See application file for complete search history.

(56) References Cited

U.S. PATENT DOCUMENTS

| | | |
|---|---|---|
| 3,303,393 A | 2/1967 | Hymes et al. |
| 3,388,301 A | 6/1968 | James |
| 3,429,040 A | 2/1969 | Miller |
| 3,689,991 A | 9/1972 | Aird |
| 3,739,236 A | 6/1973 | Loro |
| 3,871,014 A | 3/1975 | King et al. |
| 3,922,712 A | 11/1975 | Stryker |
| 4,000,842 A | 1/1977 | Burns |
| 4,074,342 A | 2/1978 | Honn et al. |
| 4,095,165 A | 6/1978 | Boros |
| 4,109,194 A | 8/1978 | Miller |
| 4,188,438 A | 2/1980 | Burns |
| 4,190,855 A | 2/1980 | Inoue |
| 4,233,558 A | 11/1980 | Gaertner |
| 4,255,672 A | 3/1981 | Ohno et al. |

(Continued)

FOREIGN PATENT DOCUMENTS

| | | |
|---|---|---|
| EP | 0 357 064 | 3/1993 |
| JP | 53-39068 | 4/1978 |
| JP | 57210638 A | 12/1982 |
| JP | 60250639 A | 12/1985 |
| JP | 611-42750 A | 6/1986 |
| JP | 6114538 A | 7/1986 |
| WO | WO85/04518 | 10/1985 |
| WO | WO99/31790 | 6/1999 |
| WO | WO01/57608 | 8/2001 |

OTHER PUBLICATIONS

Stratakos et al., "DC Power Supply Design in Portable Systems," Electronics Research Laboratory, Memorandum No. UCB/ERL M95/4, Jan. 19, 1995 (Revised Apr. 26, 1995), pp. 1–62.

(Continued)

*Primary Examiner* — Linh M. Nguyen

(57) ABSTRACT

A voltage regulator with a switch to alternately couple and decouple an input terminal to an output terminal with a variable duty cycle and a filter disposed between the input terminal and the output terminal to provide a substantially DC voltage at the output terminal. A sampling circuit makes measurements of an electrical characteristic of the voltage regulator at discrete moments of time, such as just before the opening and closing of the switch. A feedback circuit is coupled to the sampling circuit and the switch, and is configured to use the measurements to control the duty cycle to maintain the DC voltage substantially constant. The feedback circuit uses the switch as the resistive element in order to measure the current passing through the voltage regulator.

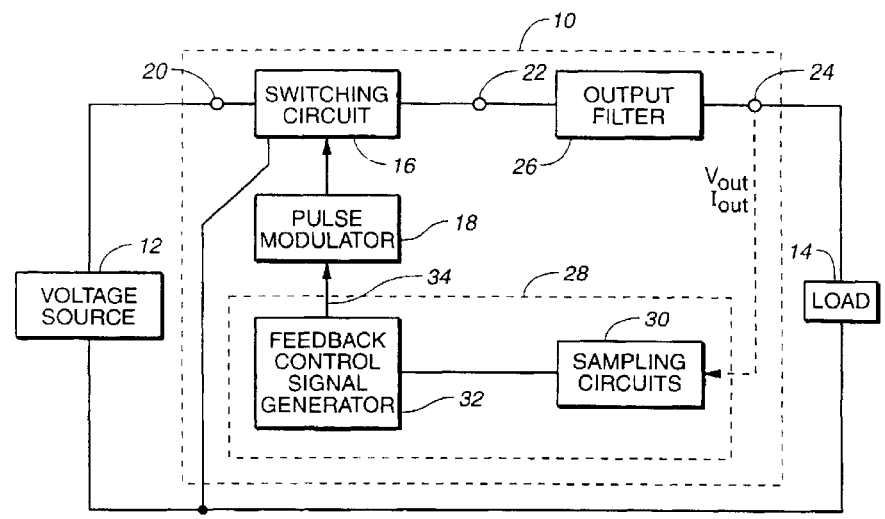

U.S. PATENT DOCUMENTS

| | | |
|---|---|---|
| 4,292,581 A | 9/1981 | Tan |
| 4,309,650 A | 1/1982 | Boros et al. |
| 4,315,316 A | 2/1982 | Boros et al. |
| 4,353,114 A | 10/1982 | Saleh |
| 4,356,542 A | 10/1982 | Bruckner et al. |
| 4,520,298 A | 5/1985 | Abbondanti |
| 4,521,725 A | 6/1985 | Phaneuf |
| 4,545,610 A | 10/1985 | Lakritz et al. |
| 4,612,617 A | 9/1986 | Laplace, Jr. et al. |
| 4,630,187 A | 12/1986 | Henze ......................... 363/41 |
| 4,636,825 A | 1/1987 | Baynes |
| 4,695,865 A | 9/1987 | Wagenaar |
| 4,725,747 A | 2/1988 | Stein et al. |
| 4,725,940 A | 2/1988 | Henze |
| 4,761,725 A | 8/1988 | Henze |
| 4,805,079 A | 2/1989 | Van Buul |
| 4,811,082 A | 3/1989 | Jacobs et al. |
| 4,821,084 A | 4/1989 | Kinugasa et al. |
| 4,825,284 A | 4/1989 | Soga et al. |
| 4,833,513 A | 5/1989 | Sasaki |
| 4,843,188 A | 6/1989 | Patterson et al. |
| 4,855,888 A | 8/1989 | Henze et al. |
| 4,890,142 A | 12/1989 | Tonnel et al. |
| 4,918,026 A | 4/1990 | Kosiak et al. |
| 4,926,241 A | 5/1990 | Carey |
| 4,929,884 A | 5/1990 | Bird et al. |
| 4,937,075 A | 6/1990 | Hollingsworth et al. |
| 4,947,101 A | 8/1990 | McVey |
| 4,948,645 A | 8/1990 | Holzinger et al. |
| 4,948,754 A | 8/1990 | Kondo et al. |
| 4,949,139 A | 8/1990 | Korsh et al. |
| 4,970,575 A | 11/1990 | Soga et al. |
| 5,003,244 A | 3/1991 | Davis, Jr. |
| 5,029,282 A | 7/1991 | Ito |
| 5,039,628 A | 8/1991 | Carey |
| 5,047,358 A | 9/1991 | Kosiak et al. |
| 5,111,278 A | 5/1992 | Eichelberger |
| 5,146,300 A | 9/1992 | Hamamoto et al. |
| 5,220,200 A | 6/1993 | Blanton |
| 5,239,196 A | 8/1993 | Ikeda et al. |
| 5,261,593 A | 11/1993 | Casson et al. |
| 5,268,871 A | 12/1993 | Dhong et al. |
| 5,272,614 A | 12/1993 | Brunk et al. |
| 5,283,452 A | 2/1994 | Shih et al. |
| 5,296,738 A | 3/1994 | Freyman et al. |
| 5,299,091 A | 3/1994 | Hoshi et al. |
| 5,305,192 A | 4/1994 | Bonte et al. |
| 5,309,324 A | 5/1994 | Herandez et al. |
| 5,352,942 A | 10/1994 | Tanaka et al. |
| 5,391,904 A | 2/1995 | Asami et al. |
| 5,399,898 A | 3/1995 | Rostoker |
| 5,410,467 A | 4/1995 | Smith et al. |
| 5,412,239 A | 5/1995 | Williams |
| 5,438,499 A | 8/1995 | Bonte et al. |
| 5,453,953 A | 9/1995 | Dhong et al. |
| 5,457,878 A | 10/1995 | Rostoker et al. |
| 5,468,681 A | 11/1995 | Pasch |
| 5,468,984 A | 11/1995 | Efland et al. |
| 5,475,296 A | 12/1995 | Vinsant et al. |
| 5,479,089 A | 12/1995 | Lee |
| 5,481,178 A | 1/1996 | Wilcox et al. |
| 5,528,480 A | 6/1996 | Kikinis et al. |
| 5,546,297 A | 8/1996 | Duley |
| 5,547,740 A | 8/1996 | Higdon et al. |
| 5,564,617 A | 10/1996 | Degani et al. |
| 5,594,631 A | 1/1997 | Katoozi et al. ................ 363/41 |
| 5,600,257 A | 2/1997 | Leas et al. |
| 5,610,452 A | 3/1997 | Shimer et al. |
| 5,610,503 A | 3/1997 | Fogg et al. |
| 5,612,553 A | 3/1997 | Arakawa |
| 5,614,762 A | 3/1997 | Kanamori et al. |
| 5,659,950 A | 8/1997 | Adams et al. |
| 5,665,991 A | 9/1997 | Efland et al. |
| 5,671,121 A | 9/1997 | McMahon |
| 5,672,894 A | 9/1997 | Maeda et al. |
| 5,677,618 A | 10/1997 | Fiez et al. |
| 5,684,305 A | 11/1997 | Pearce |
| 5,696,031 A | 12/1997 | Wark |
| 5,721,144 A | 2/1998 | Hsieh et al. |
| 5,723,974 A | 3/1998 | Gray |
| 5,731,223 A | 3/1998 | Padmanabhan |
| 5,744,843 A | 4/1998 | Efland et al. |
| 5,757,168 A | 5/1998 | DeVale |
| 5,767,010 A | 6/1998 | Mis et al. |
| 5,777,362 A | 7/1998 | Pearce |
| 5,777,383 A | 7/1998 | Stager et al. |
| 5,793,126 A | 8/1998 | Gray |
| 5,801,091 A | 9/1998 | Efland et al. |
| 5,814,844 A | 9/1998 | Nagata et al. |
| 5,818,090 A | 10/1998 | Kimura |
| 5,834,849 A | 11/1998 | Lane |
| 5,838,050 A | 11/1998 | Ker et al. |
| 5,847,951 A | 12/1998 | Brown et al. |
| 5,859,474 A | 1/1999 | Dordi |
| 5,914,873 A | 6/1999 | Blish, II |
| 5,945,730 A | 8/1999 | Sicard et al. |
| 5,945,872 A | 8/1999 | Robertson et al. |
| 5,950,072 A | 9/1999 | Queyssac |
| 5,951,804 A | 9/1999 | Kweon et al. |
| 5,951,813 A | 9/1999 | Warren |
| 5,952,726 A | 9/1999 | Liang |
| 5,953,214 A | 9/1999 | Dranchak et al. |
| 5,959,442 A | 9/1999 | Hallberg et al. |
| 5,959,443 A | 9/1999 | Littlefield |
| 5,969,513 A | 10/1999 | Clark |
| 5,969,514 A | 10/1999 | Merrill |
| 6,020,613 A | 2/2000 | Udomoto et al. |
| 6,020,729 A | 2/2000 | Stratakos et al. |
| 6,025,618 A | 2/2000 | Chen |
| 6,028,417 A | 2/2000 | Ang et al. |
| 6,031,361 A | 2/2000 | Burstein et al. |
| 6,037,636 A | 3/2000 | Crippen |
| 6,037,677 A | 3/2000 | Gattschall et al. |
| 6,041,013 A | 3/2000 | Kohno |
| 6,075,710 A | 6/2000 | Lau |
| 6,084,266 A | 7/2000 | Jan |
| 6,100,591 A | 8/2000 | Ishii |
| 6,100,676 A | 8/2000 | Burstein et al. |
| 6,117,797 A | 9/2000 | Hembree |
| 6,150,724 A | 11/2000 | Wenzel et al. |
| 6,160,441 A | 12/2000 | Stratakos et al. |
| 6,180,265 B1 | 1/2001 | Erickson |
| 6,184,555 B1 | 2/2001 | Tihanyi et al. |
| 6,198,261 B1 | 3/2001 | Schultz et al. |
| 6,268,716 B1 | 7/2001 | Burstein et al. |
| 6,271,060 B1 | 8/2001 | Zandman et al. |
| 6,278,264 B1 | 8/2001 | Burstein et al. |
| 6,287,893 B1 | 9/2001 | Elenius et al. |
| 6,331,455 B1 | 12/2001 | Rodov et al. |
| 6,400,126 B1 | 6/2002 | Zuniga et al. |
| 6,429,630 B2 | 8/2002 | Pohlman et al. |
| 6,441,487 B2 | 8/2002 | Elenius et al. |
| 6,459,248 B2 | 10/2002 | Pohlman |
| 6,462,522 B2 | 10/2002 | Burstein et al. |
| 6,476,486 B1 | 11/2002 | Humphrey et al. |
| 6,477,079 B2 | 11/2002 | Kaneko et al. |
| 6,492,738 B2 | 12/2002 | Akram et al. |
| 6,507,175 B2 | 1/2003 | Susak et al. |
| 6,512,253 B2 | 1/2003 | Watanabe et al. |
| 6,525,516 B2 | 2/2003 | Schultz et al. |
| 6,559,684 B2 | 5/2003 | Goodfellow et al. |

| | | | |
|---|---|---|---|
| 6,563,294 B2 | 5/2003 | Duffy et al. | |
| 6,570,406 B2 | 5/2003 | Tang et al. | |
| 6,580,258 B2 | 6/2003 | Wilcox et al. | |
| 6,621,312 B2 | 9/2003 | Tang et al. | |
| 6,642,698 B2 | 11/2003 | Pohlman | |
| 6,661,212 B2 | 12/2003 | Ostrom | |
| 6,670,795 B2 | 12/2003 | Pohlman et al. | |
| 6,670,858 B2 | 12/2003 | Tang | |
| 6,674,320 B2 | 1/2004 | Duffy et al. | |
| 6,693,361 B1 | 2/2004 | Siniaguine et al. | |
| 6,700,209 B1 | 3/2004 | Raiser et al. | |
| 6,703,814 B2 | 3/2004 | Pohlman et al. | |
| 6,710,605 B2 | 3/2004 | Tang et al. | |
| 6,713,823 B1 | 3/2004 | Nickel | |
| 6,794,900 B2 | 9/2004 | Tang et al. | |
| 6,847,197 B2 | 1/2005 | Susak et al. | |
| 6,857,081 B2 | 2/2005 | Pohlman | |
| 6,937,685 B2 | 8/2005 | Tang | |
| 6,965,502 B2 | 11/2005 | Duffy et al. | |
| 6,984,792 B2 | 1/2006 | Brofman et al. | |
| 6,992,384 B2 | 1/2006 | Joshi | |
| 7,002,249 B2 | 2/2006 | Duffy et al. | |
| 7,007,176 B2 | 2/2006 | Goodfellow et al. | |
| 7,023,672 B2 | 4/2006 | Goodfellow et al. | |
| 7,262,583 B2 | 8/2007 | Pohlman et al. | |
| 7,301,235 B2 | 11/2007 | Schaffer et al. | |
| 7,366,270 B2 | 4/2008 | Tang et al. | |
| 7,391,192 B2 | 6/2008 | Ostrom et al. | |
| 2001/0015497 A1 | 8/2001 | Zhao et al. | |
| 2001/0038277 A1 | 11/2001 | Burstein et al. | |
| 2002/0017697 A1 | 2/2002 | Kitamura et al. | |
| 2004/0130303 A1 | 7/2004 | Pholman et al. | |
| 2008/0185736 A1 | 8/2008 | Lin | |
| 2008/0187037 A1 | 8/2008 | Bulzacchelli et al. | |
| 2008/0197172 A1 | 8/2008 | Reiber | |

OTHER PUBLICATIONS

Sprock, et al., "Predictive Discrete Time Control of Switch-mode Applications," Department of Electrical Engineering, 1997, pp. 175–181.

Chetty, P.R.K., "Switch–mode Power Supply Design," TAB Books, Inc., 1986.

Burd, Thomas D. et al., "A Dynamic Voltage Scaled Microprocessor System," Solid–State Circuits Conference, Feb. 7–9, 2000. Paper 17.4. ISSCC. 2000 IEEE International. 20pp.

Stratakos, Anthony J. et al., Coauthored. Chapter 5, "DC Power Supply Design in Portable Systems," University of California, Berkeley, pp. 141–180, in Chandrakasan, Anantha P. and Brodersen, Robert W., Low Power Digital CMOS Design, Kluwer Academic Publishers, Norwell, MA, USA, 1995. ISBN 079239576X, 40 pages.

Dancy, Abram and Chandrakasan, Anantha (1997) "Ultra Low Power Control Circuits for PWM Converters," 1997 IEEE, 0–7803–3840–5/97, 21–27, Jun. 22–27, 1997, 7 pgs [1152–1158].

Martin, T.W. and Ang, S.S. (1995) "Digital Control for Switching Converters," IEEE Symposium on Industrial Electronics, vol. 2 of 2, Jul. 10–14, 1995, 6 pgs [1661–1666].

Lau, John H. Ed. (1994) "Chip On Board Technologies for Multichip Modules," Chapman & Hall, New York, NY, International Thompson Publishing. ISBN 0442014414. 1994.(299 pgs).

Zhou, Xunwei (1999), "Low–voltage High–efficiency Fast–transient Voltage Regulator Module," Dissertation submitted to Virginia Polytechnic Institute and State University, Jul. 1999, pp. i–xiv and 1–211 (226 pgs).

PCT International Preliminary Examination Report dated Mar. 28, 2002 issued in PCT/US2001/03756 (WO2001057608) 1pg [1670].

PCT International Search Report dated May 17, 2001 issued in PCT/US2001/03756 (WO2001057608) 1pg.

Allen, J.J. et al. (1998) "Integrated Micro Electro–Mechanical Sensor Development for Inertial Applications," 1998 IEEE, 0–7803–4330–1/98, 8 pgs [1021–1028].

Arbetter, Barry et al. (1997) "Control Method for low–Voltage DC Power Supply in Battery–Powered Systems with Power Management," IEEE Power Electronics Specialists Conference, St. Louis, MS, Jun. 22, 1997, 6 pgs [859–864].

Arbetter, Barry et al. (1997) "DC–DC Converter with Fast Transient Response and high Efficiency for Low–Voltage Microprocessor Loads," IEEE Power Electronics Specialists Conference, St. Louis, MS, Jun. 22–27, 1997, 8 pgs [865–872].

Asada, G. et al. (1997) "Low Power Wireless Communication and Signal Processing Circuits for Distributed Microsensors," 1997 IEEE Intnl Symposium on Circuits and Systems, Jun. 9–12, 1997, Hong Kong, 2817–2820, 4pgs [940–943].

Atencio, S. et al. (1999) "Design, Analysis, and Fabrication of the APT Cavities," Proceedings of the 1999 ParticleAccelerator Conference, New York, 965–967, 3 pgs [1018–1020].

Bandyopadhyay, A. et al. (1998) "A Simplified Approach to Time–Domain Modeling of Avalanche Photodiodes,"IEEE Journal of Quantum Electronics, vol. 34, No. 4, Apr. 1998, 691–699, 9 pgs [989–997].

Bentz, Ole et al. (1995) "Information Based Design Environment," 1995 IEEE No. 0–7803–2612–1/95, 10 pgs [1627–1636].

Bentz, Ole et al. (1997) "A Dynamic Design Estimation and Exploration Environment," ACM, Inc., DAC 97, Anaheim, CA, ACM 0–89791–920–3/07/06, pp. 190–195, Jun. 9–13, 6 pgs [1607–1612].

Brodersen, R. et al. (1994) "Research Challenges in Wireless Multimedia," PIMRC, 1994, p. 1.1, 1–5, 5 pgs [948–952].

Bult, K. et al. (1996) "Low Power Systems for Wireless Microsensors," ISLPED 1996 Monterey, CA, 1996, 17–21, 5 pgs [935–939].

Burd, Thoams D. et al. (2000) "A Dynamic voltage Scaled Microprocessor System," IEEE Journal of Solid–State Circuits, vol. 35, No. 11, Nov. 2000, 10 pgs [1712–1721].

Burdio, Jose et al. (1995) "A Unified Discrete–Time State–Space Model for Switching Convertrs," IEEE Transactions on Power Electronics, vol. 10, No. 6, Nov. 1995, 14 pgs [873–886].

Burstein, Amit et al. (1995) "Mixed Analog–Digital highly–Sensitive Sensor Interface Circuit for Low–Cost Microsensors," Ithe 8th Intnl Conf on Solid–State Sensors and Actuators and Eurosensors, Stockholm, Sweden, Jun. 25–29, 1995, 162–165, 4 pgs [944–947].

Burstein, Andrew et al. (1995) "The InfoPad user Interface," IEEE 1995, 1063–6390/159–162, 4 pgs [967–970].

Chandrakasan, Anantha et al. (1994) "A Low Power Chipset for a Portable Multimedia I/O Terminal," IEEE Journal of Solid–State Circuits, vol. 29, No. 12, Dec. 1994, 1415–1428, 12 pgs [892–905].

Chandrakasan, Anantha et al. (1994) A Low Power chipset for Portable Multimedia Applications, *1994 IEEE International Solid–State Circuits Conference*, ISSCC94, Session 5, Technology Directions: Low–Power Technology, Paper WP5.1, Feb. 16, 1994, 2 pgs [887–888].

Chandrakasan, Anantha et al. (1994) "Design of Portable Systems," *IEEE 1994 Custom Integrated Circuits Conference*, No. 0–7803–1886–2/94, 8 pgs [1792–1799].

Clark, W.A. and Pelosi, W. (1990) "Area Distributed Soldering of Flexible and Rigid Printed Circuit Boards," *1990 IEEE*, 0148–6411/901200–0698, 6 pgs [1003–1008].

Cooley, G. M. and Fiez, Terr (1995) "PWM and PCM Techniques for Control of Digitally Programmable Switching Power Supplies," *1995 IEEE*, 0–7803–2570–2/95, 1114–1117, 4 pgs [1044–1047].

Dancy, Abram P. (1996) "Power Supplies for Ultra Low Power Applications," Archives of the Massachusetts Insitute of Technology, Oct. 29, 1997, 103 pgs [1048–1151].

Darwish, M. et al. (1998) "Scaling Issues in Lateral power MOSFETs," *Proc of 1998 Intnl Symposium on Power Semiconductor Devices and ICs*, Kyoto, 11.33/329–332, 4 pgs [1159–1162].

élantec (1996) EL7560C Programmable CPU Power Supply Unit, élantec High Performance Analog Integrated Circuits, Inc. (product description brochure) Jul. 1996, Rev. A, 12 pgs [1202–1213].

élantec (2000) EL7556AC Programmable CPU Power Supply Unit, élantec High Performance Analog Integrated Circuits, Inc. (product description brochure) Feb. 28, 2000, 13 pgs [1163–1175].

élantec (2001) EL7556BC Integrated Adjustable 6 Amp Synchronous Switcher, élantec High Performance Analog Integrated Circuits, Inc. (product description brochure) Oct. 5, 2001, 13 pgs [1176–1188].

Farley, B.G. et al. (1962) "Computer Techniques for the study of Patterns in the Electroncephalogram," *IRE Transactions on Bio–Medical Electronics*, Jan. 1962, 9 pgs [1009–1017].

Furukawa, T. et al. (1997) Accelerated Gate–Oxide Breakdown I Mixed–Voltage I/O Circuits, *1997 IEEE*, 0–7803–3575–9/97, Apr. 8, 1997, 169–173, 5 pgs [998–1002].

Gilbert, P. et al. (1998) "A high Performance 1.5V, 0.10 μm Gate Length CMOS Technology with Scaled copper Metallization," *1998 IEEE*, IEDM 98–1013, 4 pgs [978–981].

Goodman, James et al. (1998) "An Energy/Security Scalable Encryption Processor Using an Embedded Variable Voltage DC/DC Converter," *IEEE Jrnl of Solid–State Circuits*, vol. 33, No. 11, 1799–1809, Nov. 1998, 11 pgs [1390–1400].

Griffin, Timothy E. (1995) "Multichip Modules Including Processing, A Literature Survey," Army Research Laboratory, ARL–MR–257, No. 19950906–048, Aug. 1995, 27 pgs [1401–1426].

Gupta, Tarun et al. (1997) "Implementation of a Fuzzy Controller for DC–DC Converters Using an Inexpensive 8–b Microcontroller," *IEEE Trans on Industrial Electronics*, vol. 44, No. 5, Oct. 1997, 9 pgs [1427–1435].

Gutnik, Vadim and Chandrakasan, Anantha (1997) "Embedded Power Supply for Low–Power DSP," *IEEE Trans on Very Large Scale Integration (VLSI) Systems*, vol. 5, No. 4, Dec. 1997, 11 pgs [1436–1446].

Haralson, II et al. (1997) "Numerical Simulation of Avalanche Breakdown with In–P–InGaAs SAGCM Standoff Avalanche Photodiodes," *Journal of Lightwave Technology*, vol. 15, No. 11, Nov. 1997, 4 pgs [1029–1032].

HIP5020 Integrated–Power Buck Converter Controller with Synchronous Rectification, HARRIS Seminconductor (product description brochure) File No. 4253, Jan. 1997 (19–0146: Rev. 2: 5/94), 16 pgs [1214–1229].

Huliehel, F. and Ben_Yaakow, S. (1989) "Low–Frequency Sampled–Data Models of Switched Mode DC–DC Converters," *1989 IEEE*, CH2721–9/89/0000–0492, 8 pgs [1447–1454].

Jung, Erik et al. (1999) "Flip Chip Contacts for High Current Conducting Assemblies," *1999 IEEE*, 0–7803–5502–4/99, 7 pgs [1460–1466].

Jung, Sang–Hwa et al. (1999) "An Integrated CMOS DC–DC Converter," *1998 IEEE*, 0–7803–5421–4/99, 5 pgs [1455–1459].

Koburger C. et al. (1994) "Sample, Fast, 2.5–V CMOS Logic with 0.25–μm Channel Lengths and Damascene interconnect," *1994 Symposium on VLSI Technology Digest of Technical Papers*, 7A.3, 0–7803–19212–4/94–IEEE, 2 pgs [1033–1034].

Kukrer, Osman (1996) "Discrete–Time Current Control of Voltage–Fed Three–Phase PWM," *IEEE Trans on Power Electronics*, vol. 11, No. 2, Mar. 1996, 10 pgs [1597–1606].

Li, Jieli et al. (2004) "Using Coupled Inductors to Enhance Transient Performance of Multi–Phase Buck Converters," *2004 IEEE*, No. 0–7803–8269–2/04, 1289–1203, 5 pgs [2051–2055].

Lidsky, D. and Rabaey J.M. (1994) "Low Power Design of Memory Intensive Functions Case Study: Vector Quantization," *1998 IEEE*, No. 0–7803–2123–5/94, 10 pgs [1637–1646].

Lidsky, D. and Rabaey J.M. (1996) "Early Power Exploration—A World Wide Web Application," *AMC, Inc., 33rd Design Automation Conference*, DAC96–06/96, ACM 0–89791–779–0/96/0006, 6 pgs [1621–1626].

Lidsky, D. and Rabaey, J.M. (1994) "Low–Power Design of Memory Inensive Functions," *1994 IEEE Symposium on Low Power Electronics*, No. 2.4, 2 pgs [1647–1648].

Liffring, Mark (1985) "Spice Compatible Sampled–Data Models for Switching Regulatrs," *Society of Automotive Engineers, Inc.*, SAE/P–85/164, 6 pgs [1649–1654].

Linear Technology (1993) "High Efficiency Synchronous Step–Down Switching Regulators," (product description brochure) LTC1148–3.3/LTC1148–5, 2 pgs [1273–1274].

LM2650 Synchronous Step–Down DC/DC Converter, National Semiconductor Corp. (product description brochure), DS012848, Jun. 1999, 11 pgs [1230–1240].

Loriferne, Bernard (1982) "Analog–Digital and Digital–Analog Conversion," *Heyden & Son, Ltd.*, No. ISBN 0–85501–497–0, 4 pgs [1655–1658].

Mao, R.S. et al. (1992) "A New On–Chip Voltage Regulator for High Density CMOS DRAMS," *1992 Symposium on VLSI Circuits Digest of Technical Papers*, 11–2, 1992 IEEE, 92CH3173–2/92/0000–0108, 2 pgs [1659–1660].

Maxim (1994) "Triple–Output Power–Supply controller for Notebook computers," MAX782, Maxim Integrated Products (brochure) 19–0146; Rev. 2, Jun. 1997, 2 pgs [1300–1301].

Maxim (1997) "High –Speed Step–Down Controllers with Synchronous Rectification for CPU Power," MAC1624/ MAX1625, Maxim Integrated Products (brochure) 19–1227; Rev. 1, Jun. 1997, 25 pgs [1275–1299].

Mitchell, Daniel (1988) "DC–DC Switching Regulator Analysis," Basic Switching Regulator Topologies, p. 9, ISBN 0–07–042597–3, McGraw Hill, Inc., 1988, 3 pgs [1667–1669].

Motorola (1996) "DC–to–DC Converter Control Circuits," Motorola, Inc. ((product description brochure) MC34063A/ D, MC33063A, Rev. 5, 13 pgs [1302–1314].

Narayanaswamy, S. et al. (1996) "A low–power, lightweight unit to provide ubiquitous information access Application and Network Support for InfoPad," *IEEE Personal communications*, Apr. 1996, 4–17, 14 pgs [913–926].

Nelson, Carl (1986) "LT1070 Design Manual," Linear Technology Application Note 19, Jun. 1986, No. AN19–1, 3 pgs [856–858].

Pehlke, D.R. et al. (1997) "Extremely High–Q Tunable Inductor for Si–Based RF Integrated Circuit Applications," *1997 IEEE, 64 IEDM 97–63, 3.4.1*, Dec. 7–10, 1997, 4 pgs [927–930].

Pehlke, D.R. et al. (1998) "High–Frequency Application of MOS Compact Models and their Development for Scalable RF Model Libraries," *1998 IEEE Custom Integrated Circuits Conference*, 1998, 219–222, 4 pgs [931–934].

Poulton, Ken et al. (2002) "A 4GSample/s 8b ADC in 0.35μm CMOS," *2002 IEEE International Solid–State Circuits Conference*, 2002, Session 10, High–Speed SDCs, 10.1, 3 pgs [889–891].

Poulton, Ken et al. (2002) "A 4GSample/s 8b ADC in 0.35μm CMOS," 2002 IEEE International Solid–State Circuits Conference, 2002, Session 10, High–Speed SDCs, 10.1 Visuals Supplement, 5 pgs [953–957].

Razavi, Behzad (1995) "Principles of Data Conversion System Design," *IEEE Circuits and Systems Society, IEEE Press*, No. PC4465, 5 pgs [1676–1680].

Saint, Christopher and Judy (2002) "IC Layout Basis, A Practical Guide," *McGraw–Hill*, No. ISBN 0–07–138625–4, 5 pages [1681–1685].

Schiffer et al. (1998) "An Active Charge–Cancellation System for Switched–Capacitor Sensor Interface Circuits," *IEEE ISSCC98*, Session 17, Sensor Technology, SA 17.2, 2 pgs [911–912].

Schiffer, Brian et al. (1998) An Active Charge Cancellation System for Switched–Capacitor Sensor Interface Circuits, *IEEE Journal of Solid–State Circuits*, vol. 33, No. 12, Dec. 1998, 2134–2137, 5 pgs [906–910].

Seitzer, Dieter et al. (1983) "Electronic Analog–to–Digital Converters," *John Wiley & Sons*, No. ISBN 0 471 901989, 3 pgs [1690–1692].

Sherman, J.D. and Walters, M. (1996) Synchronous Rectification: Improving the Efficiency of Buck Converter,"*EDN. com*," Mar. 14, 1996, archives at http://www.edn.com/archives/1996/031496/06df4.htm, No. EDN–03.14.96, 5 pgs [1697–1701].

Soman, Vijay (1998) "Thermal Design Considerations–EL75XX," Intersil, Application Note, Mar. 20, 1998, No. AN1096, 6 pgs [834–839].

Stratakos, Anthony et al. (1994) "A Low–Voltage CMOC DC–DC Converter for a Portable Battery–Operated System," *1994 IEEE*, No. 0–7803–1859–5/94, 619–626, 8 pgs [1722–1729].

Texas Instruments, Inc. (1999) "Low–Dropout Voltage Regulators with Integrated Delayed Reset Function," TPS7301Q, TPS7325Q, TPS7330Q, TPS7333Q, TPS7348Q, TPS7350Q, SLVS124F–6/95, Production Data (brochure), Jan. 1999, 46 pgs [1315–1360].

Wan, Marlene et al. (1998) "An Energy Conscious Methodology for Early Design Exploration of Heterogeneous DSPs," *1998 IEEE Custom Integrated Circuits Conference*, Sec 7.1.1, 8 pgs [1613–1620].

Williams, Jim and Huffman, Brian (1988) "Switched–capacitor networks simplify dc–dc converter designs (technical)," *EDN*, retrieved from the Internet at http://www.highbeam.com/DocPrint.aspc/DocID=1G1:7220705, downloaded Nov. 18, 2008, 3 pgs [4833–4835].

Williams, Richard and Blattner, Robert (1993) "Benefits of DMOS Voltage Scaling on Synchronous Buck regulator Efficiency" 1993 IEEE, No. 0–7803–1313–5/93/0000–146 146–151, 6 pgs [4827–4832].

Wong, Mike (1998) Designing a high Efficiency DC–DC Converter with the EL75XX, Intersil, Application Note, Mar. 24, 1998, No. AN1101, 16 pgs [840–855].

Texas Instruments Incorporated 1997, "TMS320C30 Digital Signal Processor," Production Data (brochure), SPRS032A Apr. 1996, Revised Jun. 1997, 54 pgs.

IEEE Standard Dictionary of Electrical and Electronics Terms, ANSI/IEEE Std. 100–1988 Fourth Edition, 1988, published by the Institute of Electrical and Electronics Engineers, Inc., p. 855—sampled data through saturated (4 pages).

McGraw–Hill Electronics Dictionary of Scientific and Technical Terms, Fifth Edition, Sybil B. Parker, 1994, p. 1229—measure through mechanical draft; p. 1748—salvage vessel through sampling spark chamber;—valley through vanadinite (6 pages).

Modern Dictionary of Electronics, Sixth Edition, Rudolf F. Graf, (Revised and Updated) (1997), pp. 183—compact cassette—compatibility; p. 879—sabin through sample–and–hold amplifier (5 pages).

Encarta World Dictionary. Bloomsbury Publishing Plc, New York, 1999. ISBN 0–312–22222–X. p. 270, *Capt.* through *caracara*, and p. 1120, *meaningless* through *mechanical*.

Webster's Third New International Dictionary of the English Language, Unabridged. Merriam Webster, Incorporated, 1993. ISBN 0–87779–201–1. p. 334, *capsule* through *caragana* and p. 1400, *measure* through *mechanical*.

Acker, Brian et al., "Synchronous Rectification with Adaptive Timing Control," Dept. of Electrical Engineering and Comp. Sciences, University of California, Berkeley 1995. IEEE ISBN 0 7803 2730 6. pp. 88–95.

Farley, B. G. and Clark, W.A. "Simulation of Self–Organized Systems by Digital Computer," Lincoln Laboratory at MIT, Cambridge, MA, 1954. Downloaded by licensed user from IEEE Xplore on Dec. 15, 2008, 9 pgs [1035–1043].

Linear Technology, "Offline Switching Regulator," (product description brochure) LT1103/LT1105, 32 pgs [1241–1272].

Sridharan, G. Oct. 1990. "Transformerless DC/DC Converter for Production of High Voltage," downloaded on Dec. 11, 2008 from IEEE Xplore, by licensed user, 3 pgs [1709–1711].

Stratakos, Anthony J. (1998) "High–Efficiency Low–Voltage DC–DC Conversion for Portable Applications," Dissertation No. UMI 9923062, Univ. CA, Berkeley, Dec. 2, 1998, 251 pgs [1800–2050].

Wei, Gu–Yeon and Horowitz, Mark, "A Low Power Switching Power Supply for Self–Clocked Systems," Computer Systems Laboratory, Stanford University, CA, funding provided under ARPA, contract #J–FBI–92–194, ISLPED 1996 Monterey, California, 5 pgs [4822–4826].

A. Bessemoulin, M. Parisot, P. Quentin, C. Saboureau, M. van Heijningen and J. Priday, "A 1–Watt Ku–band Power Amplifier MMIC using Cost–effective Organic SMD Package," 34th European Microwave Conference, Amsterdam, 2004, pp. 349–352.

Abdellatif Elmoznin et al., "The Smart Power High–Side Switch: Description of a Specific Technology, Its Basic Devices, and Monitoring Circuitries," IEEE Transactions on Electron Devices, vol. 37, No. 4, Apr. 1990, pp. 1154–1161.

Alain Dravet, Didier Desplan, Nathalie Haese and Pierre Alain Rolland, "Flip Chip and Tab Interconnects for Millimeter Wave MMICs. A Comprehensive Study," GAAS 98, Amsterdam, 1998, pp. 656–661.

Andreas Schubert et al., "Do Chip Size Limits Exist for DCA?," IEEE Transactions on Electronics Packaging Manufacturing, Oct. 1999, vol. 22 No. 4, pp. 255–263.

Anthony Tsui et al, "Direct Interconnect: New MOSFET Package Cuts On–Resistance," PCIM Power Electronic Systems, Aug. 1999, pp. 20–30.

Bruno Murari et al., "Smart Power ICs: Technologies and Applications," Itoh, K. et al., editors, Springer Series in Advanced Microelectronics, Springer 2002 (a corrected printing of the 1st edition from 1996), pp. 483–506.

C. A. Harper, editor, Electronic Packaging and Interconnection Handbook, McGraw–Hill, 1991, pp. 6.64–6.71.

C. G. Steyn and Jacobus D. van Wyk, "Study and Application of Nonlinear Turn–Off Snubber for Power Electronic Switches," IEEE Transactions on Industry Applications, vol. 1A–22, No. 3, May 1986, May/Jun. 1986, pp. 471–477.

D. R. Frear, Issues Related to the Implementation of Pb–Free Electronic Solders In Consumer Electronics, "J. Mater. Sci.: Mater. Electron," (2007), 18: pp. 319–330.

Daniel R. Gamota and Cindy M. Melton, "Advanced Encapsulant Systems for Flip–Chip–on–Board Assemblies: Underfills with Improved Manufacturing Properties," IEEE Transactions on Components, Packaging, and Manufacturing Technology, Part C, vol. 21, No. 3, Jul. 1998, pp. 196–203.

David B. Lidsky, "The Conceptual–Level Design Approach to Complex Systems", (Fall 1998) (unpublished M.S. dissertation, University of California, Berkeley) (on file with author), pp. 1–220.

Dennis A. Jarc and Donald W. Novotny, "A Graphical Approach to AC Drive Classification," IEEE Transactions on Industry Applications, vol. IA–23, No. 6, Nov. 1987 Nov./Dec. 1987, pp. 1029–1035.

Donald P. Seraphim, et al., Principles of Electronic Packaging, McGraw–Hill, 1989, pp. 595–598.

Ernst Habekotté et al., "A Coplanar CMOS Power Switch," IEEE Journal of Solid–State Circuits, vol. SC–16, No. 3, Jun. 1981, pp. 212–226.

Eugene R. Hnatek, Integrated Circuit Quality and Reliability, second edition, Marcel Dekker, 1995, pp. 99–175, 293–307.

F&K Delvotec, "Chip–on–board Technology," Apr. 4, 2007, http://www.fkdelvotec.at/press.php. (9 pages).

F. Pulvirenti et al., "Charger Power Switch for Mobile Phones," Analog and Mixed IC Design, 1997. Proceedings, 1997 2nd IEEE–CAS Region 8 Workshop on, Sep. 12–13, 1997, pp. 97–100.

Fairchild Semiconductor "FDMF8704: High Efficiency / High Frequency FET plus Driver Multi–chip Module," Rev G., Fairchild Semiconductor Corporation, Nov. 2007, pp. 1–10.

Frederick E. Sykes, "Resonant–mode power supplies: a primer," 0018–9235/89/0500–0036, IEEE Spectrum, May 1989, vol. 26, Issue: 5, pp. 36–39.

Free Online Encyclopedia, "chip on board definition of chip on board," http://encyclopedia2.thefreedictionary.com/chip–on+board, downloaded Mar. 3, 2010. (2 pages).

Gonzalo Casaravilla and Fernando Silveira, "Emitter Drive: A Technique to Drive a Bipolar Power Transistor Switching at 100kHz", Colloquium in South America, 1990., Proceedings of the 1990 IEEE, pp. 188–192.

Grace O'Malley, "The Importance of Material Selection for Flip Chip on Board Assemblies," IEEE Transactions on Components, Packaging, and Manufacturing Technology, Part B, vol. 17, No. 3, Aug. 1994, pp. 248–255.

H. W. van der Broeck et al., "On the steady–state and dynamic characteristics of bipolar transistor power switches in low–loss technology," Electric Power Applications, IEE Proceedings B 132 , Sep. 1985 vol. 132 , Issue:5, pp. 251–259 IEE Proceedings, vol. 132, Pt. B, No. 5, Sep. 1985, pp. 251–259.

IEEE Standard Dictionary of Electrical & Electronics Terms, Second Edition Revised and Expanded, IEEE Std 100–1977, Published by The Institute of Electrical and Electronics Engineers, Inc. 1977, p. 197– dominant mode through dot signal; p. 510– potier reactance through power active; p. 694– sweep–delay accuracy through switchboard lamp. (6 pages).

IEEE Standard Dictionary of Electrical and Electronics Terms, ANSI/IEEE Std. 100 1988 Fourth Edition, 1988, published by the Institute of Electrical and Electronics Engineers, Inc., p. 287– dopant through double circuit systems; p. 717– potentiometer, grounded through power; p. 718– power, active through power, active; p. 728– power rectifier transformer through power system emergency; p. 972– sweep, free—running through switchboard cord. (9 pages).

Infineon Technologies, "TDA21201: Integrated Switch (MOSFET Driver and MOSFETs)," Infineon Technologies AG., Preliminary Data Sheet, Apr. 29, 2002, downloaded from www.DatasheetCatalog.com. (16 pages).

Intel®, "DrMOS Specifications," Nov. 2004, Revision 1.0. (17 pages).

Intel®, "Mobile Pentium® II Processor at 233 MHz, 266 MHz, and 300 MHz," Intel Corporation 1998, Order No. 243669–002. (75 pages).

Intel®, "Pentium® III Processor for the PGA370 Socket at 500 MHz to 1.13 GHz," Datasheet, Revision 8, Jun. 2001, Document No. 245264–08, (94 pages).

International IOR Rectifier, iPOWIR™ Technology, "PD–60325 iP2005APbF: High Frequency Synchronous Buck Optimized LGA Power Stage: Integrated Power Semiconductors, Driver IC, & Passives," www.irf.com, Feb. 8, 2008. (18 pages).

International IOR Rectifier, iPOWIR™ Technology, "PD–94568A iP2002: Synchronous Buck Multiphase Optimized BGA Power Block: Integrated Power Semiconductors, Drivers & Passives," www.irf.com, Mar. 20, 2003. (12 pages).

IPIRA Office of Intellectual Property & Industry Research Alliances University of California, Berkeley, UC Patent Policy, Sep. 4, 1997, www.ucop.edu/ott/genresources/pat-pol_97.html. (5 pages).

J. Fjelstad, et al., "Compliancy Modeling of an Area Array Chip Scale Package", Proceedings, Surface Mount International, San Jose, CA, Sep. 10–12, 1996, vol. I, pp. 236–243.

J. Galière, J. L. Valard, E. Estèbe, "Millemetre–wave MMIC packaging compatible with surface–mount technology (SMT)," 12th GAAS Symposium, Amsterdam, 2004, pp. 591–594.

J. Giesler et al., "Flip Chip on Board Connection Technology: Process Characterization and Reliability," IEEE Transactions on Components, Packaging, and Manufacturing Technology, Part B, vol. 17, No. 3, Aug. 1994, pp. 256–263.

J. R. Wilcox, "Package Interconnects," (Presentation) IBM Corporation, Jan. 2006, pp. 1–108.

J. S. T. Huang et al., "VIB–3 Bidirectional Lateral Insulated Gate Transistors Operated in Controlled Latchup Mode," IEEE Transactions on Electron Devices, vol. 35, No. 12, Dec. 1988, p. 2458.

James M. Smith and Stanley M. Stuhlbarg, "Hybrid Microcircuit Tape Chip Carrier Materials/Processing Trade–Offs," IEEE Transactions on Parts, Hybrids, and Packaging, vol. 13, No. 3, Sep. 1977, pp. 257–268.

Jean–Paul Clech and Joseph Fjelstad, "Reliability Prediction Modeling of Area Array CSPs," Electronic Packaging Solutions International, Inc., Jun. 1997, pp. 91–96.

Jess Brown et al., "Novel Trench Gate Structure Developments Set the Benchmark for Next Generation Power MOSFET Switching Performance," PCIM Europe 2003 International Conference and Exhibition May 22, 2003. Nuremberg, Germany. (4 pages).

John H. Lau et al., Electronic Packaging: Design, Materials, Process, and Reliability, McGraw–Hill, 1998, pp. 13–14.

John H. Lau, "Cost Analysis: Solder Bumped Flip Chip Versus Wire Bonding," IEEE Transactions on Electronics Packaging Manufacturing, vol. 23, No. 1, Jan. 2000, pp. 4–11.

John H. Lau, editor, Flip Chip Technologies, McGraw–Hill, 1995, pp. 26–28, 411–413, 499–515, 526–527.

John H. Lau, editor, Handbook of Tape Automated Bonding, Van Nostrand Reinhold, 1992, ISBN 0–442–00427–3. (336 pages).

John H. Lau, Flip Chip Technologies, McGraw–Hill, 1996, ISBN 0–07–036609–8. (298 pages).

John H. Lau, Low Cost Flip Chip Technologies for DCA, WLCSP, and PBGA Assemblies, McGraw–Hill, 2000, ISBN 0–07–135141–8. (307 pages).

John Lau et al., Electronic Packaging, Design, Materials, Process and Reliability, McGraw–Hill, 1998, ISBN 0–07–037135–0. (262 pages).

Jung H. Hur et al., "GaAs–Based Opto–Thyristor for Pulsed Power Applications," IEEE Transactions on Electron Devices, vol. 37, No. 12, Dec. 1990, pp. 2520–2525.

Ken Gilleo, "Direct Chip Interconnect Using Polymer Bonding," IEEE Transactions on Components, Hybrids, and Manufacturing Technology, vol. 13, No. 1, Mar. 1990, pp. 229–234.

Kimihiro Muraoka et al., "Characteristics of the High–Speed SI Thyristor and Its Application to the 60–kHz 100–kW High–Efficiency Inverter," IEEE Transactions on Power Electronics, vol. 4, No. 1, Jan. 1989, pp. 92–100.

Kyung–Wook Paik et al., "Study On Reliability Of Flip–Chip Solder Joints Using Pb–Free Solders And Electroless Ni–P UBMs,"Proceedings, SMTA Pan Pacific Symposium, 2005. (7 pages).

L. S. Goldmann, "Geometric Optimization of Controlled Collapse Interconnections*," IBM Journal of Research and Development, vol. 13, No. 3, pp. 251–265, May 1969.

Lars S. Nielsen et al., "Low–Power Operation Using self–Timed Circuits and Adaptive Scaling of the Supply Voltage," Special Issue Papers, IEEE Transactions on Very Large Scale Integration (VLSI) Systems, vol. 2, No. 4, Dec. 1994, pp. 391–397.

Lautaro D. Salazar and Phoivos D. Ziogas, "A High Frequency Two–Switch Forward Converter with Optimized Performance," Industrial Electronics Society, 1989. IECON '89., 15th Annual Conference of IEEE, Nov. 6–10, 1989, pp. 60–66 vol. 1.

Lishan Tu et al., "Performance Characteristics of the Combined Zero–Voltage Switching Inverter with the Auxiliary Input–Current Controller," Procedings of the Power Conversion Conference—Nagaoka 1997., Aug. 3–6, 1997, vol. 2, 827–830 0/7803–3823–5/97, IEEE 1997, pp. 827–830.

M. van Heijningen and J. Priday, "Novel Organic SMD Package for High–Power Millimeter Wave MMICs," 34th European Microwave Conference, Amsterdam, Oct. 11–15, 2004, pp. 357–360.

Maxim, "Digitally Adjustable LCD Bias Supply," MAX749, Maxim Integrated Products (brochure) 19–0143; Rev. 1: Feb. 1995, pp. 1–12.

McGraw–Hill Dictionary of Electronic and Electrical Engineering, McGraw–Hill Book Company, 1984, p. 164– flasher through flip chip; p. 165– flip call through flutter echo; p. 220– instantaneous companding through insulation; p. 221– insulation coordination through intensifier electrode. (5 pages).

McGraw–Hill Dictionary of Electronic and Electrical Engineering, McGraw–Hill Book Company, 1984, pp. 164 and 221. (6 pages).

McGraw–Hill Dictionary of Scientific Technical Terms, Fourth Edition,1989, p. 556– disconformity through dishpan experiment. (4 pages).

McGraw–Hill Dictionary of Scientific and Technical Terms, McGraw–Hill Book Company, fifth edition, 1994, p. 1027. (5 pages).

McGraw–Hill Electronics Dictionary, Fifth Edition, John Markus and Neil Sclater Editors, 1994, p. 65– BT–cut crystal through bulk eraser; p. 110– concentric transmission line through confidence interval; p. 114– continuous X–rays through control system; p. 119– counter circuit through coupling coefficient; p. 207– FES through field–effect transistor; p. 230– gas–cell frequency standard through gate; p. 231– gate array through G display; p. 333– mesa transistor through metal–organic vapor–phase epitaxy; p. 494– solar flare through soldering iron; p. 573– VHF antenna through videocassette recorder; p. 578– voltage generator through voltmeter. (14 pages).

McGraw–Hill Electronics Dictionary, Fifth Edition, John Markus, Neil Sclater, 1984, p. 578– voltage generator through voltmeter; p. 494– solar flare through soldering iron. (5 pages).

MOSPOWER Applications Handbook, Robin Berliner Editor, 1984, Siliconix Incorporated, p. 2–3.

Motorola, Linear/Switchmode Voltage Regulator Handbook, 1989, pp. 95–100.

National Semiconductor Corporation, "LM2650 Synchronous Step–Down DC/DC Converter", Jun. 1999. (11 pages).

National Semiconductor, "LM1575/LM2575/LM2575HV: Simple Switcher® 1A Step–Down Voltage Regulaton," National Semiconductor Corporation, Apr. 2007. (28 pages).

National Semiconductor, LM2650 Synchronous Step–Down DC/DC Converter, Jan. 1997, (12 pages).

National Semiconductor, News Release, "National Semiconductor Announces Industry's AMP Monolithic Synchronous Battery Switcher with Greater than 96% Efficiency", downloaded on Jul. 30, 2009 from http://www.national.com/news/1996/9609/lm2650.html, (2 pages).

National Semiconductor: The Sight & Sound of Information, "Considerations in Converting from SMT to Die Assemblies," National Semiconductor Technical Seminar Series, Die Product Business Unit, Jun. 26, 2003. (38 pages).

New Webster's Dictionary of the English Language, College Edition, 1975, p. 448– disconcerted through discrepancy; p. 821– jupan through jute; p. 1137– plainsman through plane tree; p. 1786– witchery through without. (7 pages).

O. K. Mawardi et al., "High Voltage Superconducting Switch for Power Application," IEEE Transactions of Magnetics, vol. Mag–19, No. 3, May 1983, pp. 1067–1070.

Ole Bentz et al. "A Dynamic Design Estimation and Exploration Environment", Department of Electrical Engineering and Computer Science, University of California, Berkeley, Proceedings of the 34th Design Automation Conference, 1997, IEEE 1997, pp. 190–195.

Ole Bentz et al., "Information Based Design Environment", University of California, Berkeley, Workshop on VLSI Signal Processing, VIII, 1995. IEEE Signal Processing Society, Oct. 16–18, 1995, p. 237–246 IEEE 1995, pp. 237–246.

Paul Horowitz and Winfried Hill; The Art of Electronics: Second Edition, Cambridge University Press, 2006, pp. 321–322. Chapter 6 Voltage Regulators and Power Circuits, Section 8; pp. 341–345, Chapter 6 Section 16 through Section 18; p. 819: Chapter 11 Microprocessor Support Chips, Section 12. (11 pages).

Peter P. Balthasar and Eberhart Reimers, "The Integrated Power Switch," IEEE Transactions on Industry Applications, vol. 1A–12, No. 2, Mar./Apr. 1976, pp. 179–191.

Primarion, "PX7510: Single–phase Digital Integrated Power Conversion & Management IC," Di–POL™, Product Brief, Nov. 17, 2006. (2 pages).

Primarion® Power Code™, "Digital Multiphase Chipset*," Primarion® Wideband Power Products, Product Brief, 2003. (2 pages).

R. A. Petr, W. C. Nunnally and C. V. Smith, Jr., "Switching performance of a cryogenic silicon photoconductive power switch," J. Appl. Phys. 63 (8), Apr. 15, 1988, American Institute of Physics, pp. 2839–2847.

R. Jacob Baker et al., CMOS Circuit Design, Layout and Simulation, IEEE Press, 1998, ISBN 0–7803–3416–7. (468 pages).

R. Jacob Baker et al., CMOS Circuit Design, Layout and Simulation, Second Edition, IEEE Press, 2005, ISBN 978–81–265–203–4. (541 pages).

R. R. Tummala et al., editors, Microelectronics Packaging Handbook, Part II: Semiconductor Packaging Chapman & Hall, 2nd edition 1997, pp. 117–119, 935–937.

R. R. Tummala, editor, Microelectronics Packaging Handbook, Van Nostrand Reinhold, 1989, pp. 364–373.

Rao R. Tummala, Microelectronics Packaging Handbook, Semiconductor Packaging, Part II, Second Edition, Kluwer Academic Publishers, Chapman & Hall, 1997, ISBN 0–412–08431–7. (535 pages).

Renesas, "R2J20602NP: Integrated Driver—MOS FET (DrMOS)," Renesas Technology Corp., Fact Sheet Rev. 4.00, Feb. 9, 2009. (15 pages).

Request for grant of a patent—The Patent Office London, Patent Application No. 9724597.1, Nov. 20, 1997, entitled "Controller For Battery–Operated Vehicle".

Richard S. Muller et al., Device Electronics for Integrated Circuits, John Wiley & Sons, second edition, 1986, pp. 106–107.

Richard S. Muller, Device Electronics for Integrated Circuits, Second Edition, John Wiley & Sons, Inc., 1977, ISBN 0–471–88758–7. (276 pages).

Robert B. Hood, "Proposed Integrated Circuit for Appliance or Process Control," IEEE Transactions on Industry and General Applications, vol. IGA–4, No. 5, Sep. 1968, pp. 520–526.

S. M. Varosi et al., "A Simple Remote Controlled Power Switch for Internalized Bioelectronic Instrumentation," IEEE Transactions on Biomedical Engineering, Aug. 1989, vol. 26, Issue:8, pp. 858–860.

Scott E. Deering and Julian Szekely, "Mathematical Modeling of Alternative Pad Designs in Flip–Chip Soldering Processes," Journal of Electronic Materials, vol. 23, No. 12, Dec. 1994, pp. 1325–1334.

Shin'ichiro Mutoh et al., "Design Method of MTCMOS Power Switch for Low–Voltage High–Speed LSIs,"Design Automation Conference, 1999. Proceedings of the ASP–DAC '99. Asia and South Pacific Jan. 18–21, 1999, 113–116 vol. 1.

Sidney Soclof, Analog Integrated Circuits, Prentice–Hall, Inc., 1985, ISBN 0–13–032772–7. (264 pages).

Sidney Soclof, Analog Integrated Circuits. Prentice–Hall Series in Solid State Physical Electronics, Prentice Hall, Inc. 1985, p. 44. (4 pages).

Siliconfareast.com, "Chip–on–Board (COB); Direct Chip Attachment (DCA)," http://www.siliconfareast.com/cob.htm, downloaded Mar. 3, 2010. (3 pages), 2005.

Stephen Hobrecht, "An Intelligent BiCMOS/DMOS Quad 1–A High–Side Switch," IEEE Journal of Solid–State Circuits, vol. 25, No. 6, Dec. 1990, pp. 1395–1402.

Sue Chen and Joós Géza, "Series and Shunt Active Power Conditioners for Compensating Distribution System Faults," IEEE Canadian Conference on Electrical and Computer Engineering, Conference Proceedings vol. 2, May 7–10, 2000, pp. 1182–1186.

Sujit K. Biswas et al., "IGBT–Bipolar Discrete Darlington Power Switches: Performance and Design", Industry Applications Society Annual Meeting, 1991., Conference Record of the 1991 IEEE, Sep. 28–Oct. 4, 1991, vol. 2, pp. 1483–1489.

Suwanna Jittinorasett, "UBM Formation on Single Die/Dice for Flip Chip Applications," (Aug. 25, 1999) (unpublished M.S. dissertation, Virginia Polytechnic Institute and State University), http://scholar.lib.vt.edu/theses/available/etd–082699–110209/unrestricted/Final.pdf. pp. 1–89.

T. A. Smith and S. Dimitrijev, "Using the On–Resistance of a Power MOSFET to Control a DC–DC Converter," Circuits and Systems, 1998. IEEE APCCAS 1998. The 1998 IEEE Asia–Pacific Conference on, Nov. 24–27, 1998, pp. 731–733.

T. Paul Chow and B. Jayant Baliga, "A New Hybrid VDMOS–LIGBT Transistor," IEEE Electronic Device Letters, vol. 9. Sep. 1988, pp. 473–475.

T. Tsen et al., "A Low Power 16K GaAs HIMESFET static RAM with Buit–in Redundancy," Gallium Arsenide Integrated Circuit (GaAs IC) Symposium, 1990, Oct. 7–10, 1990, pp. 155–157, Technical Digest 1990., 12th Annual Rockewell International Corporation MIC/CSP, GaAs IC Symposium, pp. 155–157.

Ted Tessier and Doug Scott, editors, Bumping Design Guide, Flip Chip International LLC, May 2009. (53 pages).

Tessera: System Building Block, "The Tessera µBGA package," Product Description. 1994. (6 pages).

The American Heritage Dictionary, Second College Edition, 1982, p. 817– motionless through mountainer; p. 1384– wind instrument through wing footed. (5 pages).

The Authoritative Dictionary of IEEE Standards Terms, Seventh Edition, IEEE, 2000, p. 275– day night sound level through d–display. (6 pages).

The IEEE Standard Dictionary of electrical and Electronics Terms, Sixth Edition, IEEE Std 100–1996, 1996, p. 313– done correct through dose equivalent; p. 536– integer arithmetic through integrated circuit; p. 537– integrated Civil Engineering System through integration loss; p. 557– isochronous service octet through isolation; p. 650– metal–enclosed power switchgear through metal–oxide semiconductor; p. 808– power selsyn through power transfer relay; p. 818– principal voltage through print server; p. 1054– strip–type transmission line through structure chart; p. 1059– substitute character through subtransient internal voltage. (12 pages).

The IEEE Standard Dictionary of electrical and Electronics Terms, Sixth Edition, IEEE Std 100–1996, 1996, p. 313– done correct through dose equivalent; p. 408– fill area through filter; p. 409– filter, active through filter transmission band; page 526– input queue through insertion loss ripple, p. 535– insulation, temperature class ratings through integer adjectives, p. 516 integer arithmetic through integrated circuit; p. 537– integrated Civil Engineering System through integration loss; p. 544 interlacing impedance voltage through intermediate frequency; p. 557– isochronous service octet through isolation; p. 650– metal– enclosed power switchgear through metal–oxide semiconductor; p. 734– output signal through overcurrent; p. 808– power selsyn through power transfer relay; p. 818– principal voltage through print server; p. 1054– strip–type transmission line through structure chart; p. 1059– substitute character through subtransient internal voltage. Page 1095– 10BASE2 through terminal; p. 1096– terminal adapter through terminal, remote. (20 pages).

The New IEEE Standard Dictionary of Electrical and Electronics Terms [Including Abstracts of All current IEEE Standards], 1993, p. 802– metal–enclosed 1000 volts through metallic rectifier; p. 803– metallic rectifier cell through meter installation inspection; p. 995– power service protector through power system stabilizer. (5 pages).

Thomas M. Frederiksen, Intuitive IC Electronics, A Sophisticated Primer for Engineers and Technicians, McGraw–Hill Book Company, 1982, ISBN 0–07–021923–0. (104 pages).

Trevor A. Smith et al., "Controlling a DC–DC Converter by Using the Power MOSFET as a Voltage Controlled Resistor," IEEE Transactions on Circuits and Systems–I: Fundamental Theory and Applications, vol. 47, No. 3, Mar. 2000, pp. 357–362.

University of California Technology Transfer, UC Patent Policy 1985, Effective Nov. 18, 1985, http://www.ucop.edu/otf/genresources/pat–pol__97.html. (4 pages).

Webster's Ninth New Collegiate Dictionary, 1991, p. 1176– sub–script through substitutable. (3 pages).

Webster's Third New International Dictionary of the English Language Unabridged, Merriam–Webster Inc., Publishers, 1993, page_altaic through altitude; p. 485– consonancy through constellate; page_continental through continuous; p. 494– continuous beam through contraction; p. 646– discomycete through discourage; p. 1275– last day through lateral line; page_mottled through mount; p. 1477– mount through mountain pride; p. 1575– on through one; page_plan through planful; p. 1730– plan through planful; page_ plunge through plutonic; page_protozoacidal through provenience; p. 2300– sureness through surgeon general; p. 2620 windfallen through wind–shaken; p. 2627– wither through witted. (19 pages).

Webster's Third New International Dictionary of the English Language, Unabridged, Merriam–Webster Inc., Publishers, 1993, page_altaic through altitude, page_–arnhem through array; p. 121– arrayal through arrowhead; page_– conjugal bliss through connected load; page_– continental drift through continuous; p. 494– continuous beam through contraction; page_ed. through edict; p. 804– expurgation through extension; page_– F through face; p. 1275– last day through lateral line; page_mottled through mount; p. 1477– mount through mountain pride; p. 1575– on through one; page_– over frame through ovelook; p. 1608– overflow pipe through ovelook; page_– packet through pad; p. 1619– pad through paedomorphism; page_– plan through planful; p. 1730– plan through planful; page_– plunge through plutonic; page_– protozaocidal through provenience;

Page. 2280– substandard through subsumption; p. 2500– union card through united front; p. 2620 windfallen through wind–shaken; p. 2627– wither through witted. (28 pages).

Wikipedia, the free encyclopedia, "Pentium III," http://en.wikipedia.org/wiki/Pentium_III, last modified Nov. 16, 2007. (6 pages).

William C. Dunn, "Driving and Protection of High Side NMOS Power Switches," IEEE Transactions on Industry Applications, vol. 28, No. 1, Jan./Feb. 1992, pp. 26–30.

William D. Brown, "Advanced Electronic Packaging With Emphasis on Multichip Modules," IEEE Press Series on Microelectronic Systems, Stuart K. Tewksbury, Series Editor, IEEE Computer Society Press, Oct. 13, 1998, the Institute of Electrical and Electronics Engineers, Inc. New York, p. 784.

William G. Hawkins, "Power IC's Move Ink Jet Printers to New Performance Levels", Electron Devices Meeting, 1995, International, Dec. 10–13, 1995, pp. 959–962.

Won Namgoong et al., "SP23.2: A High–Efficiency Variable–Voltage CMOS Dynamic dc–dc Switching Regulator," IEEE International Solid–State Circuits Conference, 1997, pp. 381–381 and 489.

Wong Da Feng, "Diode as Pseudo Active Switch in High Frequency Narrowband DC/DC Converter," Power Electronics Specialist Conference, 1991. PESC '91 Record, 22nd Annual IEEE, Jun. 24–27, 1991, 182–185.

Yasuo Takahashi and Tie Gang, "Microjoining Process in Electronic Packaging and Its Numerical Analysis," Transactions of Joining and Welding Research Institute, vol. 30, (2001), No. 1, pp. 1–11.

Yida Zou et al., "In–Situ Stress State Measurements During Chip–on–Board Assembly," IEEE Transactions on Electronics Packaging Manufacturing, vol. 22, No. 1, Jan. 1999, pp. 38–52.

Bae, Seung–Jun et al., "A 2–Gb/s CMOS Interating Two–Tap DFE Receiver for Four–Drop Single–Ended Signaling", IEEE Transactions on Circuits and Systems–I: Regular Papers, vol. 56, No. 8, Aug. 2009, pp. 1645 and 1647 (2 pages).

Baker, R. Jacob, CMOS Mixed–Signal Circuit Design, vol. II of CMOS: Circuit Design, Layout, and Simulation, Chapter 32 Noise–Shaping Data Converters, 2002, pp. 155; 263 (4 pages).

Bobrow, Leonard S., "Fundamentals of Electrical Engineering", Department of Electrical and Computer Engineering, University of Massachusetts, Amherst, Oxford University Press, 1996, pp. 894; 895 (4 pages).

Borivoje, Nikolic, EE290C—Spring 2004, Advanced Topics in Circuit Design, High–Speed Electrical Interfaces, Lecture 16, Components Decision Feedback Equalizers, Lecture 16, Mar. 11, 2004, pp. 1–19 (19 pages).

"Chip on board Definition from PC Magazine Encyclopedia" obtained from the Internet at http://www.pcmag.com/encyclopedia_term/o,2542,t=chip+on+board&i=39643,00., Mar. 29, 2010; copyright © 1996–2010, 2010 Ziff Davis Publishing Holdings Inc. (3 pages).

Chip on board (COB), C–MAC MicroTechnology, 2010, http://www.cmac.com/products–and–applications/COB.php, (1 page).

Cho, Thomas B., et al., "A 10–bits, 20–MS/s, 35–m W Pipeline A/D Converter1", Department of Electrical Engineering and Computer Sciences, University of California, Berkeley, 1994, pp. 129–144 (16 pages).

Cho, et al., "Design Considerations for High–Speed Low–Power, Low–Voltage CMOS Analog–to–Digital Converters", Department of Electrical Engineering and Computer Sciences, University of California at Berkeley; Digest of Technical papers, Advanced Analog Integrated Circuit Symposium, 1994, pp. 149–171 (23 pages).

Takashi, Yasuo, et al., "Microjoining Process in Electronic Packaging and Its Numerical Analysis", Trans. JWRI, vol. 30, No. 1 (2001), pp. 1–11 (11 pages).

Davis, Paul C., et al., "Design of an Integrated Circuit for the T1C Low–Power Line Repeater", IEEE Journal of Solid–State Circuits, vol. SC–14, No. 1, Feb. 1979, pp. 109–120 (12 pages).

Doyle, Rory., et al., "Glob–Top Reliablility Characterization: Evaluation and Analysis Methods", IEEE Transaction on Components, Packaging, and Manufacturing Technology—Part A, vol. 21, No. 2, Jun. 1998, (pp. 292–300), 9 pages.

"Electronic Packaging", Wikipedia, the free encyclopedia, http://en.wikipedia.org/wiki/Electronic_packaging, last modified Apr. 22, 2010 (4 pages).

EE (Electronic Enginnering) Times—25th Anniversary. Electronics on the Threshold of the New Millennium, Issue 978, The Industry Newspaper for Engineers and Technical Management, Oct. 30, 1997 (538 pages).

Emami–Neyestanak, Azita "Design of CMOS Receivers for Parallel Optical Interconnects", A Dissertation Submitted to the Department of Electrical Engineering and the Committee on Graduate Studies of Standord University in Partial Fulfillment of the Requirements for the Degree of Doctor of Philosophy, Aug. 2004, pp. 13–14 (3 pages).

Gilleo, Ken, "Direct Chip Interconnect Using Polymer Bonding", IEEE Transactions on Components, Hybrids, and Manufacturing Technology, vol. 13, No. 1, Mar. 1990, pp. 229–234 (6 pages).

Gray, Paul, Reading Materials for EE290Y, No. 334, University of California, Berkeley, CA, Spring 1995, Boser, "The Design of Sigma–Delta Modulation Analog–to–Digital Converters", pp. 215–224 (14 pages).

Gray, Paul R., EECS290Y, Spring 1995, Analog–Digital Interfaces in VLSI Technology, University of California, College of Engineering. Dept. of Electrical Engineering and Computer Sciences, 1995, 19 pages.

Greathouse, Steve., "Chip Size Solutions: A Comparison", Intel Corporation, Chandler, AZ, SMI (Surface Mount International—Advanced Electronics Manufacturing Technologies), Proceedings of The Technical Program , San Jose, CA Aug. 29–31, 1995, pp. 36–42 (8 pages).

Gregorian, Roubik, et al., "Analog MOS Integrated Circuits for Signal Processing", A Wiley–Interscience Publication, John Wiley & Sons, Inc., ISBN 0–471–09797–7, 1986, pp. 31–32 ( 4 pages).

Greig, William. J., "Integrated Circuit Packaging, Assembly and Interconnections", Library of Congress Control No. 2006927423, ISBN 0–387–28153–3, Copyright Springer Science+Business Media LLC 2007 (3 pages).

Henkel Electronics Assembly Solutions, http://www.henkel-na.com/us/content_data/121959_LT5012_PCB_BroInside_final.pdf, retrieved from Internet Jun. 9, 2010 (39 pages).

Hu, Timothy Hak–Ting "A Parallel Architecture for High–Data–Rate Digital Receivers in Scaled CMOS Technology", Electronics Research Laboratory, College of Engineer, University of California, Berkeley, Memorandum No. UCB/ERL M93/62, Jul. 26, 1993, pp. 1, 48, and 54 (4 pages).

Infineon, Product Data Sheet, TDA7210V, Revision 1.1, Jun. 18, 2010, obtained from Internet, http://www.infineon.com/dgdl/TDA7210V_DS_Preliminary_V0.9.pdf?folderId=db3a3043191a246301192dd3ee2c2ae4&fileId=db3a3043271faefd012776007d8015f4.

Inose, Hiroshi, et al., "A Unity Bit Coding Method by Negative Feedback", in Oversampling Delta–Sigma Data Converters, Theory, Design, and Simulation, edited by James C. Candy, et al., The Institute of Electrical and Electronics Engineers, Inc., IEEE Press, ISBN 0–87942–285–8 IEEE Order No. PC0274–1, 1992, pp. 115–126 (14 pages).

Kenny, John G., et al., "Multi level Decision Feedback Equalization for Saturation Recording", IEEE Transactions on Magnetics, vol. 29, No. 3, Jul. 1993, pp. 2160–2171, 12 pages.

Koc, Ut–Va "Adaptive Electronic Dispersion Compensator for Chromatic and Polarization–Mode Dispersions in Optical Communication Systems", EURASIP Journal on Applied Signal Processing, vol. 2005: No. 10, Received Apr. 1, 2004; Revised Nov. 30, 2004, pp. 1584–1588 ( 3 pages).

Gray, Paul, R. "Analog MOS Integrated Circuits, II", Koch, et al. "A 12–bit Sigma–Delta Analog–to–Digital Converter with a 15–MHz Clock Rate", Analog MOS Integrated Circuits, II, IEEE J. Solid–State Circuits, ISBN 0–87942–246–7, Dec. 1986.

Ker, M., et al., "Area–Efficient Layout Design for CMOS Output Transistors", IEEE Transactions on Electronic Devices, vol. 44, No. 4, Apr. 1997, pp. 635–645 (11 pages).

Kolding, T. E., "Test Structure For Universal Estimation of MOSFET Substrate Effects at Gigahertz Frequencies", IEEE ICMTS, Monterey, California, USA, Mar. 2000, pp. 106–111 (6 pages).

Krishna, Kannan, et al., "A Multigigabit Backplane Transceiver Core in 0.13–μm CMOS With a Power–Efficient Equalization Architecture", IEEE Journal of Solid–State Circuits, vol. 40, No. 12, Dec. 2005, pp. 2658; 2660 (2 pages).

Lau, John H., et al., "Chip Scale Package (CSP) Design, Materials, Processes, Reliability, and Applications", McGraw–Hill, ISBN 0–07–038304–9, Chapter 1, "Solder–Bumped Flip Chip and Wire–Bonding Chip on CSP Substrate", 4 pages, Copyright 1999.

Lee, Edward, et al., Digital Communication, An Overview of Basic PAM Techniques, Kluwer Academic Publishers, ISBN 0–89838–274–2, 1988, Sec. 6.1, pp. 151–153 (6 pages).

Leibowitz, B. S., et al., "Characterization of Random Decision Errors in Clocked Comparators", IEEE 2008 Custom Integrated Circuits Conference (CICC), 978–1–4244–2018–6, 2008, pp. 691–694 (4 pages).

Lin, Xiaofeng, et al., "A CMOS Analog Continuous–Time FIR Filter for 1Gbps Cable Equalizer", Department of Electrical Engineering, University of Texas at Dallas, Circuits and Systems, 2003, ISCAS '03, Proceedings of the 2003 International Symposium, (4 pages).

Matthews, Thomas W., et al., "A Simulation Method for Accurately Determining DC and Dynamic Offsets in Comparators", 2005 IEEE International Midwest Symposium on Circuits and Systems, 2005 (4 pages).

McLenaghan, J. A., "Impact of Advanced Surface Mount Packages of SMT Manufacturing Process", Universal Instruments Corporation, Binghamton, NY, Surface Mount Technology Association Conference, 1996, pp. 501–507 (7 pages).

McLenaghan, J. A., "Integration of Flip Chip Assembly With Surface Mount Technology", Universal Instruments Corporation, Binghamton, NY, Surface Mount Technology Association Conference 1996, pp. 303–309 (7 pages).

Motorola—TMOS Power MOSFEET Transistor Device Data, Q2/96 DL135, Rev. 6, 1996 (1,184 pages).

Newaskar, Puneet P., et al., "A/D Precision Requirements for An Ultra–Wideband Radio Receiver", Microsystems Technology Laboratory, IEEE Xplore, downloaded on Jun. 9, 2010, pp. 270–275 (6 pages).

Nishimura, Ken A., "Optimum Partitioning of Analog and Digital Circuitry in Mixed–Signal Circuits for Signal Processing", Electronics Research Laboratory, College of Engineering, University of California, Berkeley, Memorandum No. UCB/ERL M93/67, Jul. 26, 1993, pp. 1, 6–8 (4 pages).

Razavi, Principles of Data Conversion System Design, IEEE Circuits and Systems, Sponsor, The Institute of Electrical and Electronics Engineers, Inc., New York, ISBN 0–7803–1093–4, IEEE Order No. PC4465, 1995, pp. 6–11; 176–197 (15 pages).

Razavi, Design of Analog CMOS Integrated Circuits, published by McGraw–Hill, ISBN 0–07–238032–2, 2001, p. 423 (3 pages).

Surface–mount technology—Wikipedia, the free encyclopedia, Surface–mount technology (9 pages), retrieved from Internet on Mar. 29, 2010, http://en.wikipedia.org/wiki/Surface–mount_technology.

Shi, Changchun, et al., "Floating–Point to Fixed–Point Conversion with Decision Errors Due to Quantization", Berkeley Wireless Research Center, Department of EECS, University of California, Berkeley, 2004, (4 pages).

Sewter, Jonathan, "Descision Equalizers and Their Application to Magnetic Storage Read Channels", ECE1352F Term Paper, 981514870, Nov. 15, 2002 (20 pages).

Shoval, Ayal, et al., "A 100 Mb/s BiCMOS Adaptive Pulse–Shaping Filter", IEEE Journal On Selected Areas in Communications, vol. 13, No. 9, Dec. 1995, pp. 1692 and 1699 (2 pages).

Shoval, D.A. Johns and W.M. Snelgrove, "Median–Based Offset Cancellation Circuit Technique", IEEE International Symposium on Circuits and Systems, San Diego, May 1992, pp. 2033–2036 (4 pages).

Shoval, Ayal, et al., "A CMOS Mixed–Signal 100Mbs Receive Architecture for Fast Ethernet", IEEE 1998 Custom Integrated Circuits Conference, (1998) pp. 12.1.1–12.1.4 (4 pages).

Somers, Steve, QSC—New Product Guide, AV Technology, DVI HDMI Signals Over Twisted–Pair Cable, Mar. 6, 2009 (3 pages), http://www.avtechnologyonline.com/article/27096.aspx.

Spineanu, Andreea, et al. "An Electromechanical Sigma–Delta Modulator For Acceleration Measuring Systems", 1997 IEEE International Symposium On Circuits and Systems, Jun. 9–12, 1997, pp. 2765–2768 (4 pages).

Sytsma, Steve., et al., "Die attach Processes for High Reliability Chip–On–Board (COB) Manufacturing", Pan Pacific Symposium Conference, Feb. 5, 2005, Surface Mount Technology Association (9 pages).

Van Ierssel, Marcus Henricus "Circuit Techniques for High–Speed Serial and Backplane Signaling", thesis submitted in conformity with the requirements for the degree of Doctor of Philosophy, Department of Electrical and Computer Engineering, University of Toronto, 2007, pp. 13, 65, 66, and 72 (5 pages.

Watkinson, John, "The Art of Digital Audio—Third Edition", Focal Press, An imprint of Elesevier, first published 1988, third edition 2001 (2 pages).

Voorman, J. O., et al., "A One–Chip Automatic Equalizer For Echo Reduction in Teletext", IEEE Transactions on Consumer Electronics, vol. CE–27, No. 3, Aug. 1981, pp. 521–529.

Wei, Derrick Chunkar, et al., "A 300MHz Mixed–Signal FDTS/DFE Disk Read Channel in 0.6μm CMOS" ISSCC 2001/Session 12/Signal Processing for Storage Coding/12.4, 2001 IEEE International Solid–State Circuits Conference, 0–7803–6608–5, (3 pages).

Wei, Derrick Chunkai, et al., "A 300–MHz Fixed–Delay Tree Search–DFE Analog CMOS Disk–Drive Read Channel", IEEE Journal of Solid–State Circuits, vol. 36, No. 11, Nov. 2001, pp. 1795–1796 (2 pages).

Wong, et al., "A 50 MHz Eight–Tap Adaptive Equalizer for Partial–Response Channels", IEEE Journal of Solid–State Circuits, vol. 30, No. 3, Mar. 1995, pp. 228–234 (7 pages).

Gauen, Kim, "Designing with TMOS Power MOSFETs", Motorola Semiconductor Products, Inc., AN–913 Application Note, 1983, pp. 1–19 (19 pages).

Shapiro, A., et al., "Electronic Packaging for Extended Mars Surface Missions", obtained from Internet http//www/trs–new.jpl.nasa.gov/dspace/bitstream/2014/38188/1/03–3098.pdf, 2010, 23 pages.

Fallon, Kenneth M., "Flip Chip Attach Solder Deposition Alternatives", IBM Microelectronics Division, Endicott, NY, pp. 310-318, 1996.

Robertson, Dave, "Selecting Mixed–Signal Components for Digital Communication System—An Introduction", Analog Diaglogue, 30–3, 1996, 24 pages.

Norsworthy, Steven R. et al., "Delta–Sigma Data Converters", IEEE Circuits and Systems Society, The Institute of Electrical and Electronics Engineers, New York, 1997, ISBN 0–7803–1045–4, IEEE Order No. PC3954, 6 pages.

1996 International Symposium on Microelectronics, Oct. 8–10, 1996, Minneapolis Convention Center, Minneapolis, Minnesota, published in cooperation with SPIE—the International Society for Optical Engineering, Mis, J.D., et al., "Flip Chip Production Experience: Some Design, Process, Reliability, and Cost Considerations" vol. 2920, ISBN [0–930815–48–3], 1996, pp. 291–295 (7 pages).

Advanced Micro Devices, The AMD Fine–Pitch Ball Grid Array (FBGA) for Flash Memory and Chip–Scale Packaging for AMD Flash Memory Products, Sep. 3, 1998, 3 pages and Sep. 28, 1998, 7 pages.

Baggerman, Antal F., et al., "Low–Cost Flip–Chip on Board", IEEE Transactions on Components, Packaging, and Manufacturing Technology—Part B., vol. 19, No. 4, Nov. 1996, 11 pages.

Brooks, Richard, et al., ICEMM Proceedings 1993, "Direct Chip Attach—A Viable Chip Mounting Alternative", p. 595–598, 4 pages.

Cherry Semiconductor Datasheet, CS3341/51–CS386/387, "Alternator Voltage Regulator Darlington Driver", 7 pages, 1999, Cherry Semiconductor Corporation, downloaded from Internet @ www.datasheetcatalog.com on Jul. 2010.

Chip Assembly Technologies, obtained from Internet: http://www.wtec.org/loyola/ep/c4s8.htm, published Feb. 1995, 5 pages.

Clough, Sherry L., Thesis "Flip Chip Attachment Methods: A Methodology for Evaluating the Effects of Supplier Process Variation and Supplier Relationships on Product Reliability", B.S.E. Industrial and Operations Engineering, University of Michigan, submitted to the Sloan School of Management and the Dept. of Materials Science Engineering on May 8, 1998, 110 pages.

Corbin, J. S., "Finite Element Analysis for Solder Ball Connect (SBC) Structural Design Optimization", IBM J. Res. Develop, vol. 37, No. 5, Sep. 1993, pp. 585–596 (12 pages).

DeHaven, Keith, et al., "Controlled Collapse Chip Connection (C4)—An Enabling Technology", IEEE, 1994, pp. 1–6 (6 pages).

Electronicsweekly.com, Lord Corporation Announces Advancements in flip chip underfill technology, Thursday, Aug. 30, 2007, obtained from Internet: electronicsweekly.com, Jul. 22, 2010 (1 page).

Electronic Design—for Engineers and Engineering Managers—WorldWide, cover feature, Goodenough, Frank, "High–Output Switcher IC Converts 5V to Less than 3V", Jun. 24, 1996, pp. 55–60.

Emulation Technology, Inc., Chip–On–Board/Chip–On–Flex/Bare Die Assemblies, obtained from internet http://www.emulation.com/catalog/die/attach.cfm, 2010 (1 page).

Garrou, Philip E., et al., "Multichip Module Technology Handbook", McGraw–Hill ISBN 0–07–022894–9, (12 pages).

Ginsberg, Gerald L., et al., "Multichip Modules and Related Technologies", ISBN 0–07–023552–X, 1994, 297 pages.

08–CV–5129–JCS, Exhibit 18, to the Reply Expert Expert Report of Philip Garrou, Ph.D. on the Issues of Invalidity of U.S. Patent Nos. 6,278,264 and 6,462,522, Glossary of terms used in electronics, obtained from Internet, http://www.ami.ac.uk/courses/topics/0100_gls/glossary/glossc.htm, 2010, 6 pages.

Hnatek, Eugene R., Integrated Circuit Quality and Reliability, second edition, revised and expanded, Marcel Dekker, 1995, p. 303, 8 pages.

Hnatek, Eugene R., Integrated Circuit Quality and Reliability, second edition, revised and expanded, Marcel Dekker, 1995, Ch. 2, pp. 84–85, 9 pages.

Intel Packaging Databook, Jan. 1998, 30 pages.

IPC Association Connecting Electronics Industries, IPC–SM–784, Guidelines for Chip–on–Board Technology Implementation, ANSI/IPC–SM–784, Nov. 1990, 53 pages.

Goodman, Thomas W., et al., TechSearch International, Inc., Technology Licensing and Consulting FCIP and Expanding Markets for Flip Chip, Jul. 1997, 271 pages.

µBGA™ Design Process, Products MBGA—Design Process, downloaded from Internet, http://www.tessers.com/technology/p–design.htm, Aug. 28, 1998, 12 pages.

Kraynak, Paul, "Wafer–Chip Assembly for Large–Scale Integration", IEEE Transactions on Electron Devices, Vol. ED–15, No. 9, Sep. 1968, pp. 660–663, (4 pages).

Loeffier, Mario, "Polymer–Core Solder Balls: An Alternative to Solid Solder Balls?", CircuiTree, Tapco Circuit Supply, obtained from Internet, http://www.circuitree.com/Articles/Feature_Article/4d93912c4d26b010VgnVCM100000f932a8c0, Jul. 26, 2010, 4 pages.

Lu, Jicun, et al., "The International Journal of Microcircuits and Electronic Packaging—Detecting Underfill Delamination and Cracks in Flip Chip on Board Assemblies Using Infrared Microscope", vol. 21, No. 3, Third Quarter 1998 (ISSN 1063–1674), pp. 231–236 , 11 pages.

McGovern, Lawrence P., et al., "Initial Development Work on a High Throughput Low Cost Flip Chip on Board Assembly Process", in Proceedings 1997 International Symposium on Microelectronics, Oct. 14–16, 1997, SPIE vol. 3235, pp. 285–289, (8 pages).

Messner, George, et al. "Thin Film—Multichip Modules", ISBN 0–930815–33–5, 1992, (12 pages).

Merriam Webster's Collegiate Dictionary—Tenth Edition, copyright 1994, ISBN 0–87779–708–0 (unindexed—ISBN 0–87779–709–9 (indexed), p. 984 , refuse—register (4 pages).

Modern Dictionary of Electronics, Sixth Edition, Revised and Updated, Graf, Rudolf F., 1997, ISBN 0–7506–9870–5, pp. 121: building–out–circuit to bunch strandling and 548: lateral loss to layer–winding, 5 pages.

Motorola, Inc. Datasheet MCCF33095, MC33095 , Advance Information, Integral Alternator Regulator, 1996, downloaded from Internet at www.datasheetcatalog.com on Jul. 2010, 14 pages.

Mukherjee, Satyen, et al., "LDMOS and LIGT's In CMOS Technology for Power Integrated Circuits", 778–IEDM 87, 1987, 33.6, pp. 778–781 (4 pages).

Nakano, Fumio, et al., "Proceedings of the 1987 International Symposium on Microelectronics", Sep. 28–30, 1987, Resin–Insertion Effect on Thermal Cycle Resistivity of Flip–Chip Mounted LSI Devices, pp. 536–541, Sep. 28–30, 1987 (7 pages).

National Semiconductor, LM2650, Synchronous Step–Down DC/DC Converter, 1996, 12 pages.

National Semiconductor, Press Release, "National Semiconductor Announces Industry's First 3 Amp Monolithic Synchronous Battery Switcher With Greater than 96% Efficiency" obtained from Internet, http://www.national.com/news/1996/9609/lm2650.html, Jul. 30, 2009, 2 pages.

New Webster's Dictionary of the English Language, College Edition, 1975, p. 118– balderdash through ballerina; p. 1146– plumbism to pluriaxial; p. 1374– sentence to sept. (6 pages).

New Webster's Dictionary of the English Language, College Edition, 1975, p. 1690– unionist through United Nations (4 pages).

O'Malley, Grace, et al., "The Importance of Material Selection for Flip Chip on Board Assemblies", IEEE Transactions on Components, Packaging, and Manufacturing Technology—Part B, vol. 17, No. 3, Aug. 1994, pp. 248–255 (8 pages).

Powell, D.O, et al., "Flip–Chip On FR–4 Integrated Circuit Packaging", in 1993 Proceedings 43rd Electronic Components and Technology Conference, Jun. 1–4, 1993, pp. 182–186 (6 pages).

Puttlitz, Karl J., et al. [editors], Area Array Interconnection Handbook, Kluwer Academic Publishers, ISBN 0–7923, 2001, 247 pages.

Sematech, Joint Industry Standard—Implementation of Flip Chip and Chip Scale Technology, J–STD–012, Jan. 1996, 13 pages.

Tummala, R. R., et al., [editors,]Microelectronics Packaging Handbook, 1989 by Van Nostrand Reinhold, ISBN 0–442–20578–3, Chapter 6, pp. 361–453 (175 pages).

Tummala, R. R., et al., [editors,] Microelectronics Packaging Handbook, Part II: Semiconductor Packaging, Chapman & Hall, 2nd edition 1997, Chapter 8, 179 pages.

Tummala, R. R., et al., [editors,] Microelectronics Packaging Handbook, Subsystem Packaging, Part III, Second Edition, Chapman & Hall, 1997, p. 386–482 (112 pages).

Tummala, R. R., et al., [editors,] Microelectronics Packaging Handbook, Subsystem Packaging, Part III, Second Edition, Chapman & Hall, 1997, pp. 245–339 (94 pages).

Tummala, R. R., et al., [editors,] Microelectronics Packaging Handbook, Technology Drivers, Part I, Second Edition, Chapman & Hall, 1997, Ch. 5.5, pp. 457–508; 8.3, pp. 137–195 (124 pages).

Tsukada, Y., et al., "Surface Laminar Circuit Packaging", 0569–5503/92/0000–0022, pp. 22–27 (6 pages).

TOKO Datasheet, CMOS LDO, GC3–J024E, p. 1–35.

TWI Technology Engineering, Primary Encapsulants 'Glob top', downloaded from Internet, http://www.twi.co.uk/content/tfglobtp.html, Jul. 2010, 1 page.

Vardaman, E. Jan, TechSearch International, Inc., Global Flip Chip Business Overview, 2004, 36 pages.

Vestling, et al., "A Novel High–Frequency High–Voltage LDMOS Transistor Using an Extended Gate Resurf Technology", 0–7803–3993–2/97, IEEE, 1997, pp. 45–48 (4 pages).

Wei, Gu–Yeon, et al., "A Fully Digital, Energy–Efficient, Adaptive Power–Supply Regulator", IEEE Journal of Solid–State Circuits, vol. 34, No. 4, Apr. 1999, pp. 520–529 (9 pages).

White Electronic Designs, Chip On Board Assembly, http://www.whiteedc.com/chip-on-board.html, obtained from internet 2010 (2 pages).

Widlar, Robert J., "New Developments in IC Voltage Regulators", IEEE Journal of Solid–State Circuits, vol. sc–6, No. 1, Feb. 1971, p. 2–7 (6 pages).

Wilson, Syd R., et al., "Handbook of Multilevel Metallization for Integrated Circuits", Noyes Publications, ISBN 08155–1340–2, 1993 (5 pages).

Zhang, Hui, et al., "Low–Swing Interconnect Interface Circuits", obtained from Internet, IEEE Xplore, Jun. 1, 2010, 6 pages.

Zhang, S., et al., "A new approach to flip chip on board technology using SMT compatible processes", Microelectronics International 16/3 (1999), MCB University Press (ISSN 1356–5362), pp. 39–42, 4 pages.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 2, 4, 13 and 15-17 is confirmed.

New claims 20-164 are added and determined to be patentable.

Claims 3, 5-12, 14 and 18-19 were not reexamined.

20. *A method of operating a voltage regulator having an input terminal to be coupled to an input voltage source and an output terminal to be coupled to a load, comprising:*
   *alternately coupling and decoupling the input terminal to the output terminal with a power switch according to a variable duty cycle;*
   *filtering a current between the input terminal and the output terminal to provide a substantially DC voltage at the output terminal;*
   *capturing a measurement of an electrical characteristic of the voltage regulator at a discrete moment of time with a sampling circuit, the discrete moment of time depending on the variable duty cycle;*
   *receiving the captured measurement with a feedback circuit coupled to the sampling circuit and the power switch; and*
   *using the measurement to control the power switch to maintain the DC voltage substantially constant.*

21. *The method of claim 20 wherein the discrete moment occurs at an offset from a coupling or decoupling of the power switch.*

22. *The method of claim 21 wherein the offset depends on the variable duty cycle.*

23. *The method of claim 22 wherein the offset is such that the measurement is made and captured in the middle of a conduction period that extends between coupling and decoupling of the power switch.*

24. *The method of claim 23 wherein the offset is such that the measurement is captured in the middle of the conduction period of a device that connects the output terminal to ground.*

25. *The method of claim 24 wherein the device is a transistor.*

26. *The method of claim 24 wherein the device is a diode.*

27. *The method of claim 21 wherein the offset is a delay between the discrete moment of time and subsequent coupling or decoupling of the power switch.*

28. *The method of claim 21 wherein the power switch alternately couples and decouples with a period $T_s$ and the offset is small in comparison with period $T_s$.*

29. *The method of claim 21 wherein the offset is such that the measurement in combination with at least one additional measurement provides an estimate for an average value of the electrical characteristic.*

30. *The method of claim 21 wherein the offset is such that the discrete moment occurs in the middle of a conduction period of a device in the power switch.*

31. *The method of claim 30 wherein the device is a transistor or diode that provides rectification.*

32. *The method of claim 21 wherein the offset is such that the discrete moment occurs just prior to the end of a conduction period.*

33. *The method of claim 21 wherein the offset is such that the measurement is made and captured slightly before the power switch couples or decouples the input terminal to the output terminal.*

34. *The method of claim 21 wherein the offset is approximately equal to a time required by the sampling circuit to make and capture the measurement.*

35. *The method of claim 20 wherein the measurement is made and captured in the middle of a conductive period that extends between coupling and decoupling of the power switch.*

36. *The method of claim 20 wherein the power switch comprises a first transistor that couples and decouples the input terminal to an intermediate terminal and a second transistor that couples and decouples the intermediate terminal to ground.*

37. *The method of claim 36 wherein the filter includes an inductor disposed between the intermediate terminal and the output terminal.*

38. *The method of claim 36 wherein the sampling circuit operates to capture a first measurement at a first discrete moment when the first transistor is in a conducting mode, and to capture a second measurement at a second discrete moment when the second transistor is in a conducting mode.*

39. *The method of claim 37 wherein the sampling circuit operates to capture a first measurement corresponding to an output voltage and a second measurement corresponding to a current through the inductor during a first time interval when the first transistor is in a conducting mode, and to capture a third measurement corresponding to an output voltage and fourth measurement corresponding to a current through the inductor during a second time interval when the second transistor is in a conducting mode.*

40. *The method of claim 36 wherein the sampling circuit operates to make and capture a first plurality of measurements at a first plurality of discrete moments when the first transistor is in a conducting mode, and to make and capture a second plurality of measurements at a second plurality of discrete moments when the second transistor is in a conducting mode.*

41. *The method of claim 36 wherein the measurement is made and captured in the middle of a conduction period of the second transistor.*

42. *The method of claim 20 further comprising providing a first signal to the power switch to control the variable duty cycle and providing a second signal to the sampling circuit to control the making and capturing of the measurement.*

43. *The method of claim 20 wherein the feedback circuit receives an additional captured measurement from another discrete moment of time and uses the captured measurement in combination with the additional captured measurement to control the power switch.*

44. *The method of claim 43 wherein the feedback circuit averages the captured measurement and the additional measurement.*

45. *The method of claim 20 wherein the filter includes an inductor and the electrical characteristic is a current in the inductor.*

46. *The method of claim 45 wherein the measurement is captured as a voltage on a capacitor.*

47. The method of claim 45 wherein the measurement is of a voltage across a resistive element.

48. The method of claim 47 wherein the resistive element is disposed between the input terminal and the output terminal.

49. The method of claim 20 wherein the measurement is quantized by an analog to digital converter.

50. The method of claim 49 wherein the feedback circuit includes digital circuitry.

51. The method of claim 20 wherein the feedback circuit is implemented using switched-capacitor based circuitry.

52. The method of claim 50 further comprising controlling the duty cycle of the power switch using a microprocessor.

53. The method of claim 50 further comprising controlling the duty cycle of the power switch using firmware or software in a microprocessor.

54. The method of claim 45 further comprising capturing a plurality of measurements of an output voltage at a plurality of discrete moments of time.

55. The method of claim 54 wherein the plurality of measurements are averaged to obtain an average output voltage.

56. The method of claim 54 wherein the plurality of discrete moments of time occur within a switching cycle of the power switch.

57. The method of claim 36 wherein the discrete moment of time occurs at the end of a conduction interval of the first transistor.

58. The method of claim 57 further comprising making and capturing an additional measurement of the electrical characteristic at the end of a conduction interval of the second transistor.

59. The method of claim 58 further comprising combining the measurement and the additional measurement.

60. The method of claim 59 wherein the electrical characteristic is output voltage.

61. The method of claim 59 wherein the filter includes an inductor, and the electrical characteristic is current in the inductor.

62. The method of claim 20 wherein the filter includes an inductor, and the measurement is a measurement of current in the inductor, further comprising making and capturing a measurement of an output voltage.

63. The method of claim 62 wherein the duty cycle is dependent on the current in the inductor and the output voltage.

64. The method of claim 63 further comprising generating an integrated voltage from a measurement of the output voltage, the duty cycle being further dependent on the integrated voltage.

65. The method of claim 64 wherein the duty cycle is dependent on at least one factor that is scaled by a gain.

66. The method of claim 65 wherein the duty cycle is dependent on at least two factors that are each separately scaled.

67. The method of claim 66 wherein the output voltage is scaled to provide a scaled output voltage, the inductor current is separately scaled to provide a scaled inductor current, and the scaled output voltage, the scaled inductor current, and the integrated voltage are combined to provide a control signal, the duty cycle depending on the control signal.

68. The method of claim 65 wherein the at least one factor is scaled by an amplifier.

69. The method of claim 20 wherein the sampling circuit makes and captures a measurement at a discrete moment of time when switching noise is at or near a minimum.

70. The method of claim 20 wherein the sampling circuit makes and captures a plurality of measurements of the electrical characteristic, the sampling circuit making and capturing one or more measurements per switching cycle.

71. A method of operating a voltage regulator having an input terminal to be coupled to an input voltage source and an output terminal to be coupled to a load, comprising:

alternately coupling and decoupling the input terminal to the output terminal with a power switch including intermittently connecting the input terminal to an intermediate terminal with a first transistor and intermittently connecting the intermediate terminal to ground with a second transistor, according to a variable duty cycle;

filtering a current between the input terminal and the output terminal to provide a substantially DC voltage at the output terminal;

capturing a measurement of an electrical characteristic of the voltage regulator at a discrete moment of time with a sampling circuit, the discrete moment of time depending on the variable duty cycle;

receiving the captured measurement with a feedback circuit coupled to the sampling circuit and the power switch; and using the measurement to control the power switch to maintain the DC voltage substantially constant.

72. The method of claim 71 wherein the power switch and the feedback circuit are implemented using the same fabrication techniques.

73. The method of claim 71 wherein the power switch and the feedback circuit are implemented using CMOS fabrication.

74. The method of claim 71 wherein the measurement is quantized by an analog to digital converter.

75. The method of claim 74 wherein the feedback circuit includes digital circuitry.

76. The method of claim 75 wherein the duty cycle of the power switch is controlled by a microprocessor.

77. The method of claim 75 wherein the duty cycle of the power switch is controlled by microprocessor firmware or software.

78. The method of claim 71 wherein the filter includes an inductor, and the feedback circuit uses a measured output voltage and a measured voltage corresponding to a current through the inductor to determine the duty cycle.

79. The method of claim 71 wherein the filter includes an inductor, and the electrical characteristic is current in the inductor.

80. The method of claim 71 wherein the power switch has a period Ts and the sampling circuit makes and captures measurements of the electrical characteristic at one or more discrete moments of time during each period Ts.

81. The method of claim 80 wherein the sampling circuit makes and captures measurements of the electrical characteristic at two or more discrete moments of time during each period Ts.

82. The method of 71 wherein the discrete moment of time is offset by a delay between the discrete moment of time and subsequent coupling of the power switch.

83. The method of claim 71 wherein the discrete moment of time is offset by a delay between the discrete moment of time and subsequent decoupling of the power switch.

84. The method of claim 71 wherein the measurement is made and captured in the middle of a conductive period of the second transistor.

85. The method of claim 71 wherein the filter is coupled between the intermediate terminal and the output terminal, and wherein the filter includes an inductor.

86. The method of claim 85 wherein the sampling circuit operates to make and capture a first measurement at a first discrete moment when the first transistor is in a conducting mode, and to make and capture a second measurement at a second discrete moment when the second transistor is in a conducting mode.

87. The method of claim 85 wherein during a first time interval when the first transistor is in a conducting mode the sampling circuit operates to make and capture a first measurement corresponding to an output voltage and a second measurement corresponding to a current through the inductor; during a second time interval when the second transistor is in a conducting mode, the sampling circuit operates to make and capture a third measurement corresponding to an output voltage and a fourth measurement corresponding to a current through the inductor.

88. The method of claim 85 wherein the sampling circuit operates to make and capture a first plurality of measurements at a first plurality of discrete moments when the first transistor is in a conducting mode, and to make and capture a second plurality of measurements at a second plurality of discrete moments when the second transistor is in a conducting mode.

89. The method of claim 85 wherein the measurement is made and captured in the middle of a conductive period of the second transistor.

90. The method of claim 85 further comprising providing a first signal to the power switch to control the variable duty cycle and providing a second signal to the sampling circuit to control the making and capturing of the measurement.

91. The method of claim 85 wherein the feedback circuit receives an additional captured measurement from another discrete moment of time and uses the captured measurement in combination with the additional captured measurement to control the power switch.

92. The method of claim 91 wherein the feedback circuit averages the captured measurement and the additional measurement.

93. The method of claim 85 wherein the electrical characteristic is a current in the inductor.

94. The method of claim 93 wherein the measurement is captured as a voltage on a capacitor.

95. The method of claim 93 wherein the current is inferred by a voltage drop across a resistive element.

96. The method of claim 95 wherein the resistive element is coupled between the input terminal and the output terminal.

97. The method of claim 85 wherein the measurement is quantized by an analog to digital converter.

98. The method of claim 97 wherein the feedback circuit includes digital circuitry.

99. The method of claim 85 wherein the feedback circuit is implemented using switched-capacitor based circuitry.

100. The method of claim 85 further comprising controlling the duty cycle of the power switch using a microprocessor.

101. The method of claim 85 wherein the duty cycle of the power switch is controlled using microprocessor firmware or software.

102. The method of claim 85 wherein the sampling circuit makes and captures a measurement of current in the inductor, further comprising a voltage sampling circuit making and capturing a plurality of measurements of an output voltage at a plurality of discrete moments of time.

103. The method of claim 102 wherein the plurality of measurements are averaged to obtain an average output voltage.

104. The method of claim 103 wherein the plurality of discrete moments of time occur within a switching cycle of the power switch.

105. The method of claim 85 wherein the sampling circuit makes and captures a measurement of current in the inductor, further comprising making a measurement of an output voltage with another circuit.

106. The method of claim 105 wherein the duty cycle is dependent on the current in the inductor and the output voltage.

107. The method of claim 106 further comprising generating an integrated voltage from a measurement of the output voltage, the duty cycle being further dependent on the integrated voltage.

108. The method of claim 107 wherein the duty cycle is dependent on at least one factor that is scaled by a gain.

109. The method of claim 108 wherein the duty cycle is dependent on at least two factors that are each separately scaled.

110. The method of claim 109 wherein the output voltage is scaled to provide a scaled output voltage, the inductor current is separately scaled to provide a scaled inductor current, and the scaled output voltage, the scaled inductor current, and the integrated voltage are combined to provide a control signal, the duty cycle depending on the control signal.

111. The method of claim 108 wherein the at least one factor is scaled by an amplifier.

112. The method of claim 85 wherein the sampling circuit makes and captures a measurement at a discrete moment of time when switching noise is at or near a minimum.

113. The method of claim 85 wherein the sampling circuit makes and captures a plurality of measurements of the electrical characteristic, the sampling circuit making and capturing one or more measurements per switching cycle.

114. A method of operating a voltage regulator having an input terminal to be coupled to an input voltage source and an output terminal to be coupled to a load, comprising:

alternately coupling and decoupling the input terminal to the output terminal with a power switch;

filtering a current between the input terminal and the output terminal to provide a substantially DC voltage at the output terminal;

capturing a measurement of an electrical characteristic of the voltage regulator at a discrete moment of time with a sampling circuit, wherein the electrical characteristic is current in an inductor, the measurement captured as a voltage on a capacitor;

receiving the captured measurement with a feedback circuit coupled to the sampling circuit and the power switch; and using the measurement to control the power switch to maintain the DC voltage substantially constant.

115. The method of claim 114 further comprising connecting a plate of the capacitor to a terminal in the voltage regulator to capture the voltage.

116. The method of claim 114 wherein the voltage is a voltage across a resistive element and the current in the inductor is inferred from the voltage.

117. The method of claim 116 wherein the resistive element is disposed between the input terminal and the output terminal.

118. The method of claim 117 wherein the resistive element is directly connected to a plate of the capacitor.

119. The method of claim 116 wherein the resistive element is a resistance of a component of the voltage regulator.

120. The method of claim 119 wherein the resistive element is the resistance of a transistor.

121. The method of claim 114 wherein a plate of the capacitor is connected to ground.

122. The method of claim 114 wherein a plate of the capacitor is connected to a reference voltage.

123. The method of claim 114 wherein a plate of the capacitor is connected to an input voltage source.

124. The method of claim 114 wherein the discrete moment of time is dependent on a variable duty cycle of the power switch.

125. The method of claim 114 further comprising a voltage sampling circuit to capture a measurement of an output voltage.

126. The method of claim 125 wherein the power switch couples and decouples the input terminal to the output terminal with a variable duty cycle, and the duty cycle is dependent on the current in the inductor and on the output voltage.

127. The method of claim 126 further comprising generating an integrated voltage from a measurement of the output voltage, the duty cycle being further dependent on the integrated voltage.

128. The method of claim 127 wherein the duty cycle is dependent on at least one factor that is scaled by a gain.

129. The method of claim 128 wherein the duty cycle is dependent on at least two factors that are each separately scaled.

130. The method of claim 129 wherein the output voltage is scaled to provide a scaled output voltage, the current in the inductor is separately scaled to provide a scaled inductor current, and the scaled output voltage, the scaled inductor current, and the integrated voltage are combined to obtain a control signal, the duty cycle depending on the control signal.

131. The method of claim 128 wherein the at least one factor is scaled by an amplifier.

132. The method of claim 125 wherein the measurement of the output voltage is made and captured at the discrete moment of time.

133. The method of claim 114 further comprising making and capturing a plurality of measurements of an output voltage at a plurality of discrete moments of time using a voltage sampling circuit.

134. The method of claim 133 further comprising averaging the plurality of measurements to obtain an average output voltage.

135. The method of claim 133 wherein the plurality of discrete moments of time occur within a switching cycle of the power switch.

136. The method of claim 119 further comprising intermittently connecting the input terminal to an intermediate terminal with a first transistor in the power switch, intermittently connecting the intermediate terminal to ground with a second transistor in the power switch, wherein the discrete moment in time is at the midpoint of a conduction interval of the second transistor.

137. The method of claim 119 further comprising intermittently connecting the input terminal to an intermediate terminal with a first transistor in the power switch, intermittently connecting the intermediate terminal to ground with a second transistor in the power switch, wherein the discrete moment in time is at the end of the conduction interval of the first transistor.

138. The method of claim 137 further comprising capturing a second measurement of current in the inductor at a second discrete moment of time at the end of the conduction interval of the second transistor, and combining the measurement and the second measurement to obtain an average measurement.

139. The method of claim 114 wherein a plurality of measurements of current in the inductor are captured at a plurality of discrete moments of time, and the plurality of measurements are combined.

140. The method of claim 114 wherein the feedback circuit sums the captured measurement and at least one other measurement with a summing circuit.

141. The method of claim 116 further comprising providing a sampling switch disposed between the resistive element and the capacitor.

142. The method of claim 141 wherein when the sampling switch is closed the capacitor is coupled in parallel with the resistive element.

143. The method of claim 114 further comprising intermittently connecting the input terminal to an intermediate terminal with a first transistor of the power switch, and intermittently connecting the intermediate terminal to ground with a second transistor of the power switch.

144. The method of claim 114 wherein the measurement is quantized by an analog to digital converter.

145. The method of claim 144 wherein the duty cycle of the power switch is controlled by a microprocessor.

146. The method of claim 144 wherein the duty cycle of the power switch is controlled using microprocessor firmware or software.

147. The method of claim 114 wherein a plurality of measurements of current are made and captured by the current sampling the circuit, wherein one or more measurements are made per switching cycle.

148. A method of operating a voltage regulator having an input terminal to be coupled to an input voltage source and an output terminal to be coupled to a load, comprising:
   alternately coupling and decoupling the input terminal to the output terminal with a power switch with a period Ts;
   filtering a current between the input terminal and the output terminal to provide a substantially DC voltage at the output terminal;
   capturing measurements of an electrical characteristic of the voltage regulator at two or more discrete moments of time during each period Ts with a sampling circuit;
   receiving the measurements with a feedback circuit coupled to the sampling circuit and the power switch; and
   using the measurements to control the power switch to maintain the DC voltage substantially constant.

149. The method of claim 148 wherein the power switch includes a first transistor intermittently connecting the input terminal to an intermediate terminal, and a second transistor intermittently connecting the intermediate terminal to ground.

150. The method of claim 148 wherein the measurements are quantized by an analog to digital converter.

151. The method of claim 150 wherein the feedback circuit includes digital circuitry.

152. The method of claim 150 wherein the duty cycle of the power switch is controlled by a microprocessor.

153. The method of claim 150 wherein the duty cycle of the power switch is controlled using microprocessor firmware or software.

154. The method of claim 148 wherein the power switch has a variable duty cycle and at least one of the measurements is made at a discrete moment of time that is dependent on the variable duty cycle.

155. The method of claim 154 wherein the filter includes an inductor and the electrical characteristic is current in the inductor.

156. The method of claim 155 wherein the electrical characteristic is captured as a voltage on a capacitor.

157. The method of claim 148 wherein the electrical characteristic is an output voltage and the filter includes an inductor, further comprising making a measurement of current in the inductor.

158. The method of claim 157 wherein a duty cycle of the power switch is dependent on the current in the inductor and the output voltage.

159. The method of claim 158 further comprising generating an integrated voltage from a measurement of the output voltage, the duty cycle being further dependent on the integrated voltage.

160. The method of claim 159 wherein the duty cycle is dependent on at least one factor that is scaled by a gain.

161. The method of claim 160 wherein the duty cycle is dependent on at least two factors that are each separately scaled.

162. The method of claim 161 wherein the output voltage is scaled to provide a scaled output voltage, the inductor current is separately scaled to provide a scaled inductor current, and the scaled output voltage, the scaled inductor current, and the integrated voltage are combined to provide a control voltage, the duty cycle depending on the control voltage.

163. The method of claim 162 wherein the at least one factor is scaled by an amplifier.

164. The method of claim 114 wherein the measurement is made and captured in the middle of a conductive period that extends between coupling and decoupling of the power switch.

* * * * *

(12) INTER PARTES REEXAMINATION CERTIFICATE (1291st)
United States Patent
Stratakos et al.

(10) Number: US 6,225,795 C2
(45) Certificate Issued: Jun. 24, 2016

(54) DISCRETE-TIME SAMPLING OF DATA FOR USE IN SWITCHING REGULATIONS

(75) Inventors: Anthony J. Stratakos, Fremont, CA (US); David B. Lidsky, Oakland, CA (US); William A. Clark, Fremont, CA (US)

(73) Assignee: Volterra Semiconductor Corporation

Reexamination Request:
No. 95/002,091, Aug. 20, 2012

Reexamination Certificate for:
Patent No.: 6,225,795
Issued: May 1, 2001
Appl. No.: 09/481,744
Filed: Jan. 11, 2000

Reexamination Certificate C1 6,225,795 issued Jun. 7, 2011

Related U.S. Application Data

(63) Continuation of application No. 08/991,394, filed on Dec. 16, 1997, now Pat. No. 6,020,729.

(51) Int. Cl.
*H02M 3/155* (2006.01)
*H02M 3/156* (2006.01)
*H02M 3/04* (2006.01)
*H02M 3/157* (2006.01)

(52) U.S. Cl.
CPC ..................... *H02M 3/157* (2013.01)

(58) Field of Classification Search
None
See application file for complete search history.

(56) References Cited

To view the complete listing of prior art documents cited during the proceeding for Reexamination Control Number 95/002,091, please refer to the USPTO's public Patent Application Information Retrieval (PAIR) system under the Display References tab.

*Primary Examiner* — Margaret Rubin

(57) ABSTRACT

A voltage regulator with a switch to alternately couple and decouple an input terminal to an output terminal with a variable duty cycle and a filter disposed between the input terminal and the output terminal to provide a substantially DC voltage at the output terminal. A sampling circuit makes measurements of an electrical characteristic of the voltage regulator at discrete moments of time, such as just before the opening and closing of the switch. A feedback circuit is coupled to the sampling circuit and the switch, and is configured to use the measurements to control the duty cycle to maintain the DC voltage substantially constant. The feedback circuit uses the switch as the resistive element in order to measure the current passing through the voltage regulator.

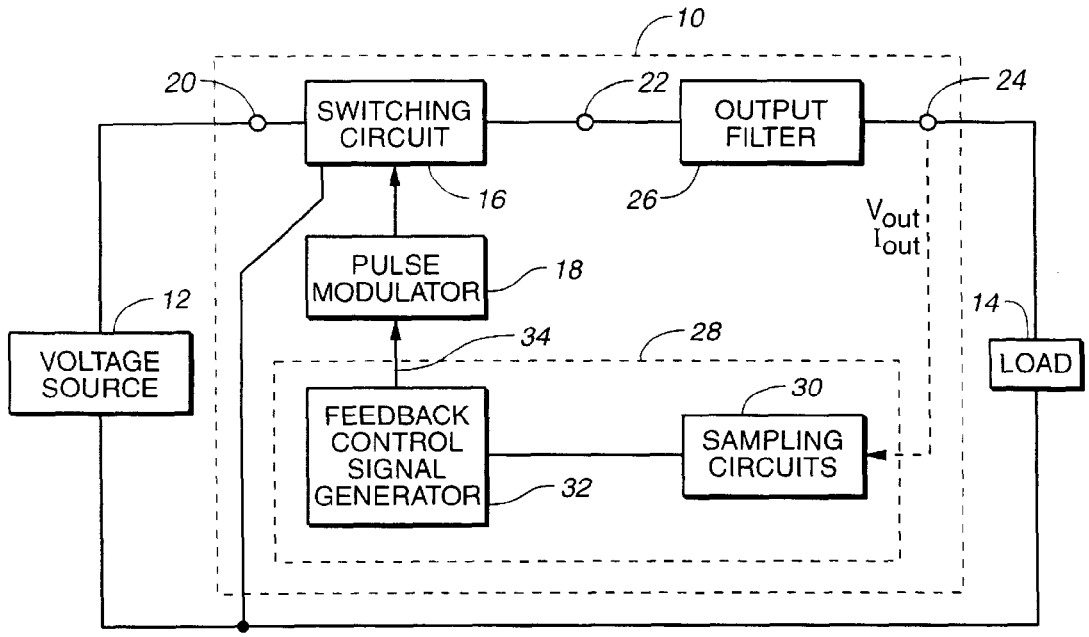

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-164 are cancelled.

\* \* \* \* \*